United States Patent
Park et al.

(10) Patent No.: US 11,374,630 B2
(45) Date of Patent: Jun. 28, 2022

(54) METHOD FOR REPORTING CHANNEL STATE INFORMATION BY MEANS OF TERMINAL IN WIRELESS COMMUNICATION SYSTEM, AND APPARATUS THEREFOR

(71) Applicants: LG ELECTRONICS INC., Seoul (KR); SOGANG UNIVERSITY RESEARCH FOUNDATION, Seoul (KR)

(72) Inventors: Jonghyun Park, Seoul (KR); Jiyeong Yang, Incheon (KR); Wonjin Sung, Seoul (KR); Haewook Park, Seoul (KR)

(73) Assignees: LG Electronics Inc., Seoul (KR); Sogang University Research Foundation, Seoul (KR)

( * ) Notice: Subject to any disclaimer, the term of this patent is extended or adjusted under 35 U.S.C. 154(b) by 0 days.

(21) Appl. No.: 17/295,619

(22) PCT Filed: Nov. 19, 2019

(86) PCT No.: PCT/KR2019/015804
§ 371 (c)(1),
(2) Date: May 20, 2021

(87) PCT Pub. No.: WO2020/111624
PCT Pub. Date: Jun. 4, 2020

(65) Prior Publication Data
US 2022/0021421 A1   Jan. 20, 2022

(30) Foreign Application Priority Data
Nov. 26, 2018 (KR) .................. 10-2018-0147457

(51) Int. Cl.
| | | |
|---|---|---|
| H04L 25/02 | (2006.01) | |
| H04B 7/0456 | (2017.01) | |
| H04L 5/00 | (2006.01) | |

(52) U.S. Cl.
CPC ......... *H04B 7/0456* (2013.01); *H04L 5/0048* (2013.01); *H04L 25/0204* (2013.01)

(58) Field of Classification Search
CPC .. H04B 7/0626; H04B 7/0417; H04B 7/0628; H04B 7/0632; H04B 7/04; H04B 7/0456;
(Continued)

(56) References Cited

U.S. PATENT DOCUMENTS

| | | | |
|---|---|---|---|
| 10,904,040 B2* | 1/2021 | Zirwas | H04B 7/265 |
| 2013/0321207 A1* | 12/2013 | Monogioudis | H01Q 3/40 342/373 |

(Continued)

FOREIGN PATENT DOCUMENTS

| | | |
|---|---|---|
| EP | 3358754 | 8/2018 |
| KR | 1020180025941 | 3/2018 |
| WO | 2018128498 | 7/2018 |

OTHER PUBLICATIONS

Yang, Jiyeong et al., 3D Antenna Structure Using Uniform Triangular Arrays for Efficient Full-Directional Multiuser Transmission, Nov. 5, 2019, see sections 1-4.

*Primary Examiner* — Eva Y Puente
(74) *Attorney, Agent, or Firm* — Dentons US LLP

(57) ABSTRACT

A method for reporting channel state information (CSI) by means of a terminal in a wireless communication system, according to one embodiment of the present invention, comprises the steps of: receiving a channel state information reference signal (CSI-RS) from a base station, wherein the CSI-RS is related to at least one panel of an antenna array of the base station; generating CSI on the basis of the
(Continued)

CSI-RS and a codebook according to a specific shape of the at least one panel; and reporting the CSI to the base station.

18 Claims, 35 Drawing Sheets

(58) Field of Classification Search
CPC .. H04B 7/0452; H04B 7/0491; H04B 7/0617; H04B 7/063; H04L 5/0048; H04L 5/0023; H04L 5/0035; H04L 5/0044; H04L 5/0096
USPC ......................................................... 375/267
See application file for complete search history.

(56) References Cited

U.S. PATENT DOCUMENTS

| | | | |
|---|---|---|---|
| 2018/0076875 A1* | 3/2018 | Haverinen | G01S 3/28 |
| 2018/0248720 A1 | 8/2018 | Park et al. | |
| 2018/0309490 A1 | 10/2018 | Rahman et al. | |
| 2019/0097843 A1* | 3/2019 | Obara | H04B 7/0413 |
| 2019/0349042 A1* | 11/2019 | Ramireddy | H04B 7/0473 |
| 2020/0220603 A1* | 7/2020 | Hao | H04B 7/0617 |

* cited by examiner

[FIG. 1]
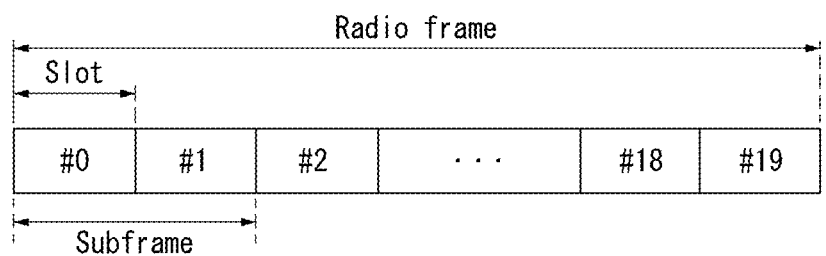

[FIG. 2]
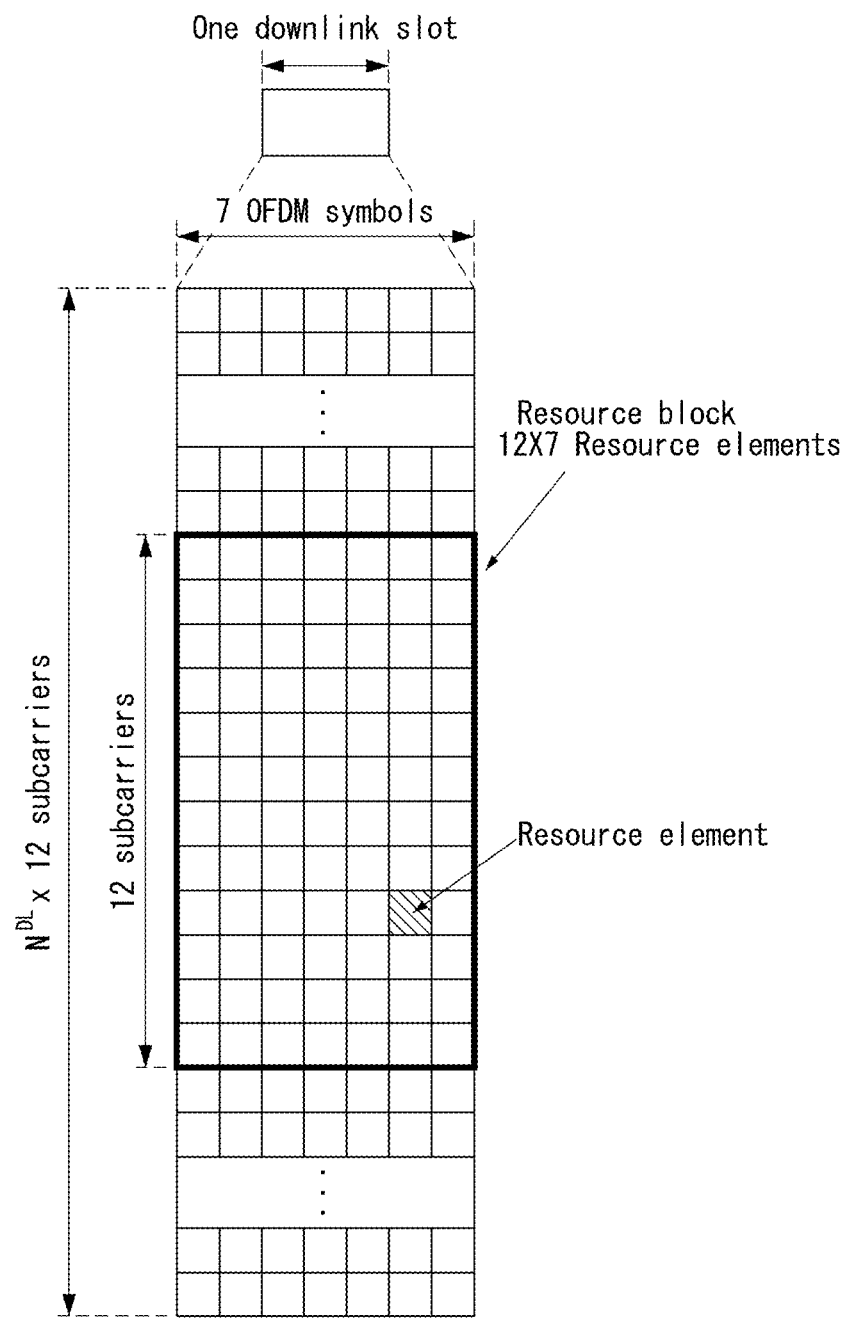

[FIG. 3]
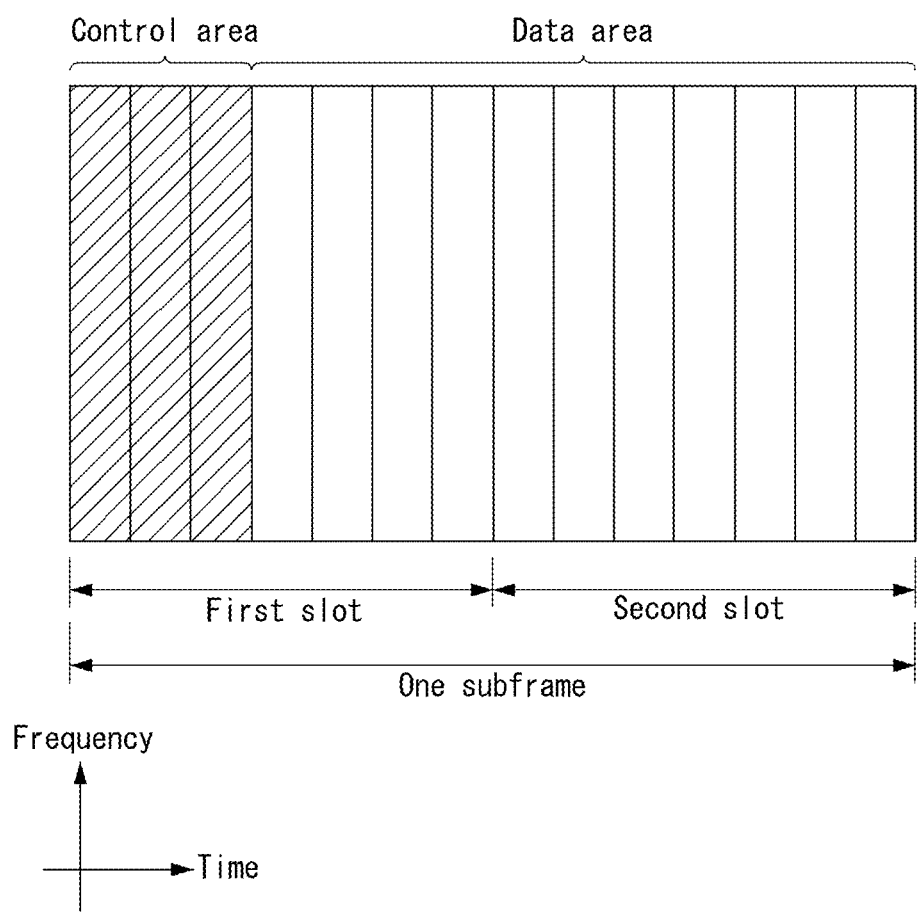

[FIG. 4]
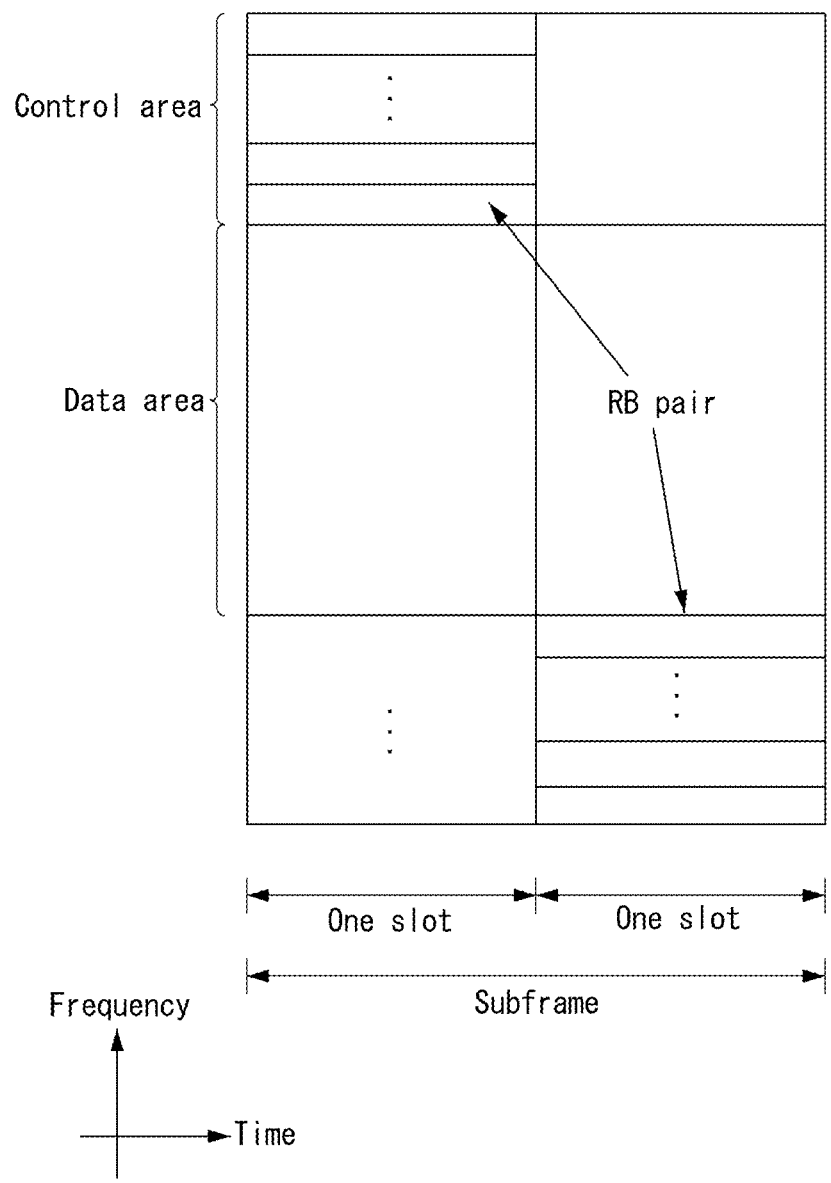

[FIG. 5]
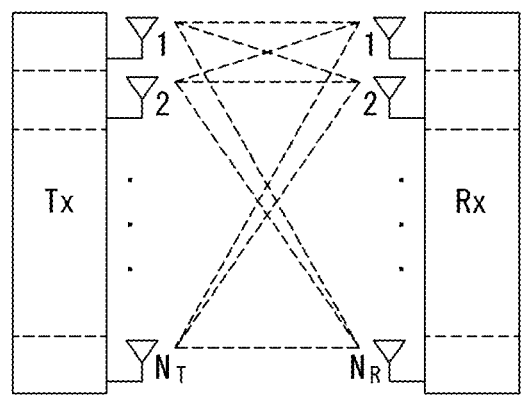
[FIG. 6]
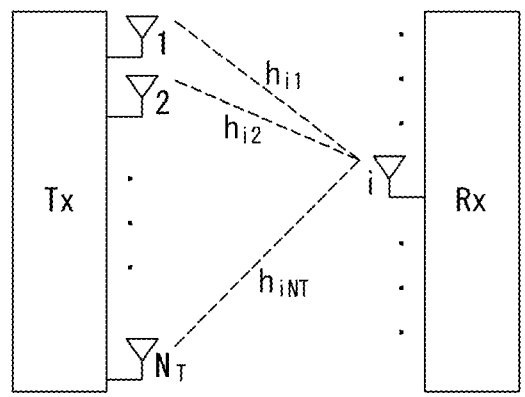

[FIG. 7]
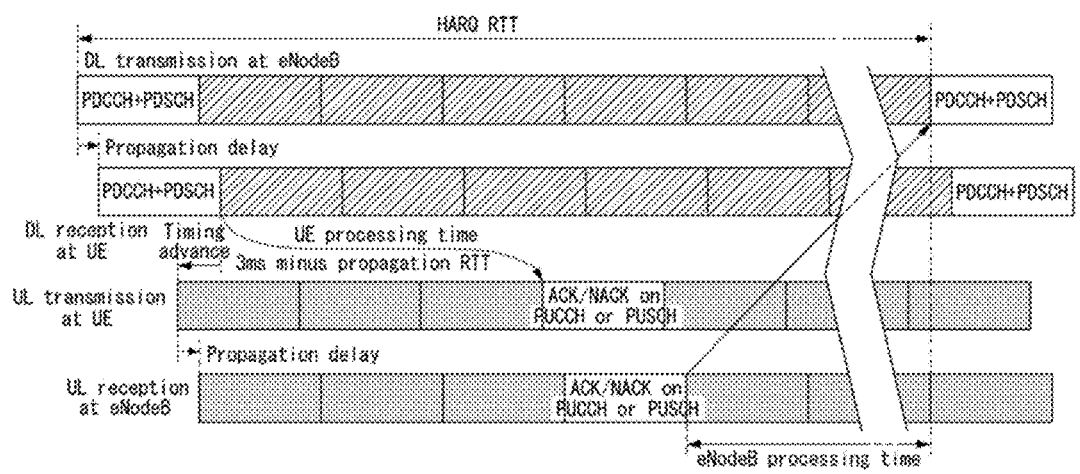

[FIG. 8]
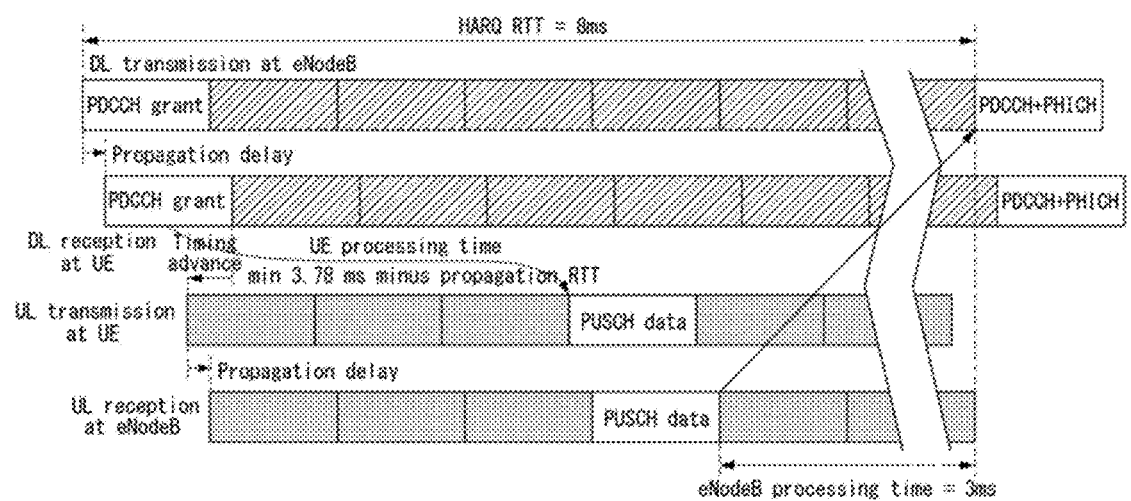

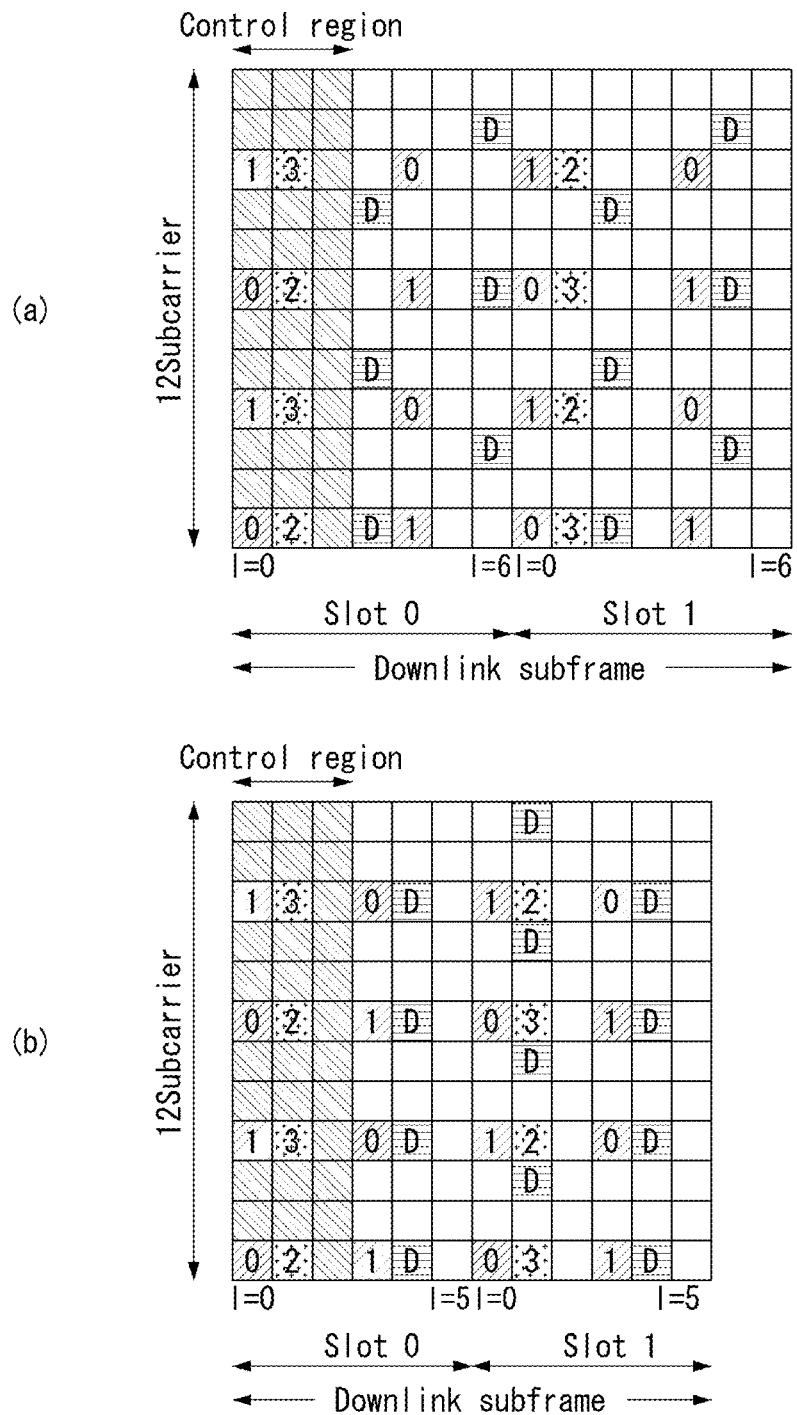
[FIG. 9]

[FIG. 10]
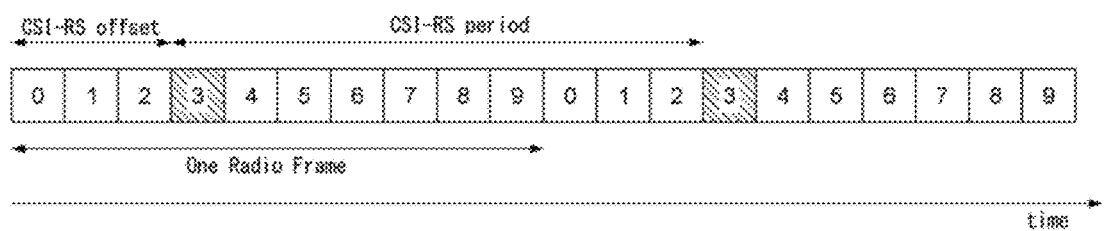

[FIG. 11]
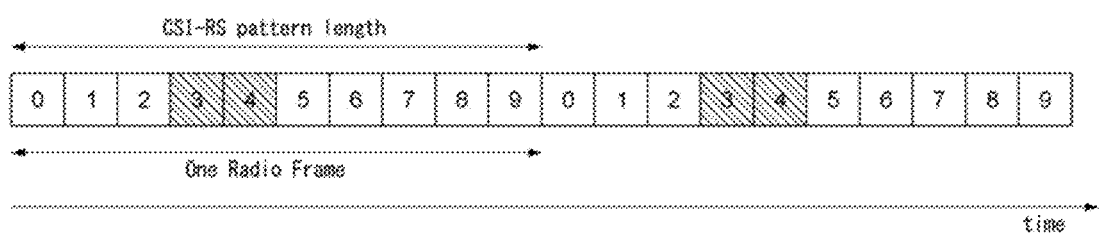

[FIG. 12]
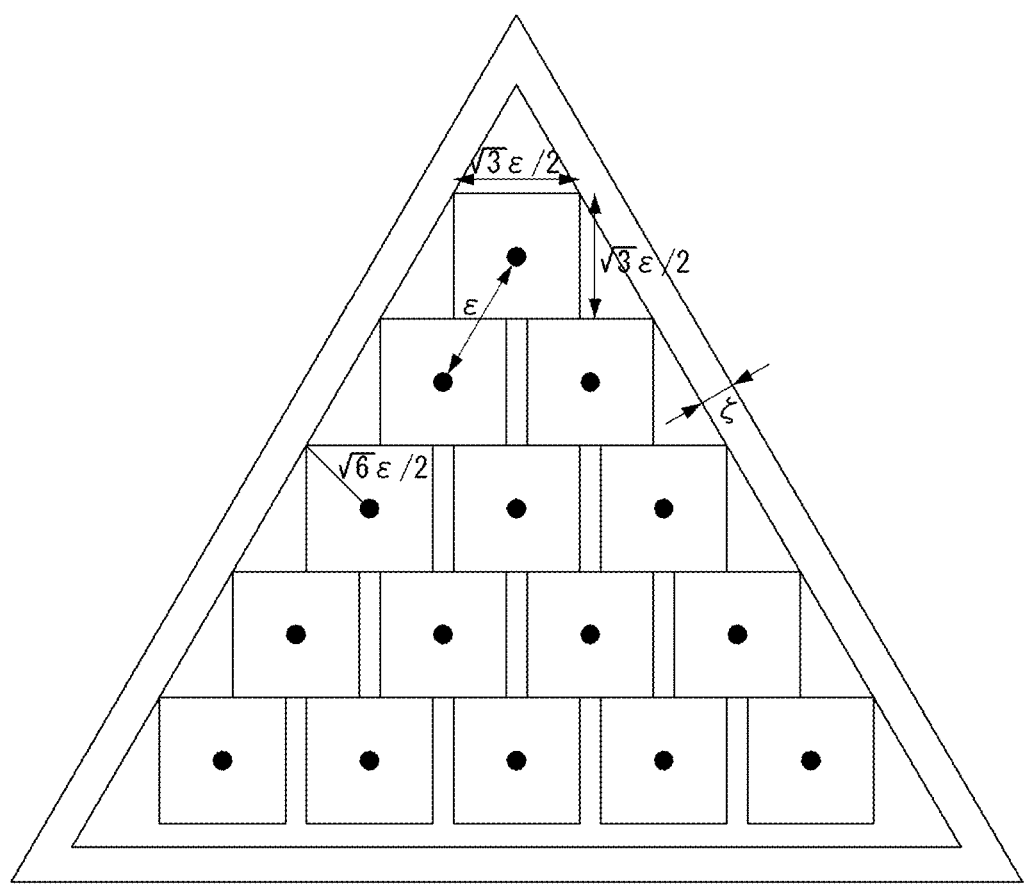

[FIG. 13]
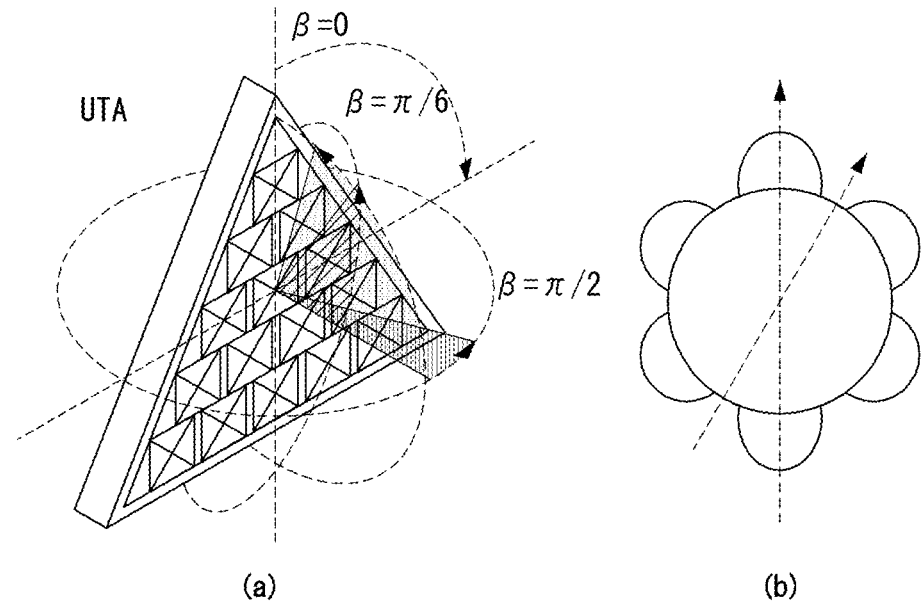
(a)  (b)
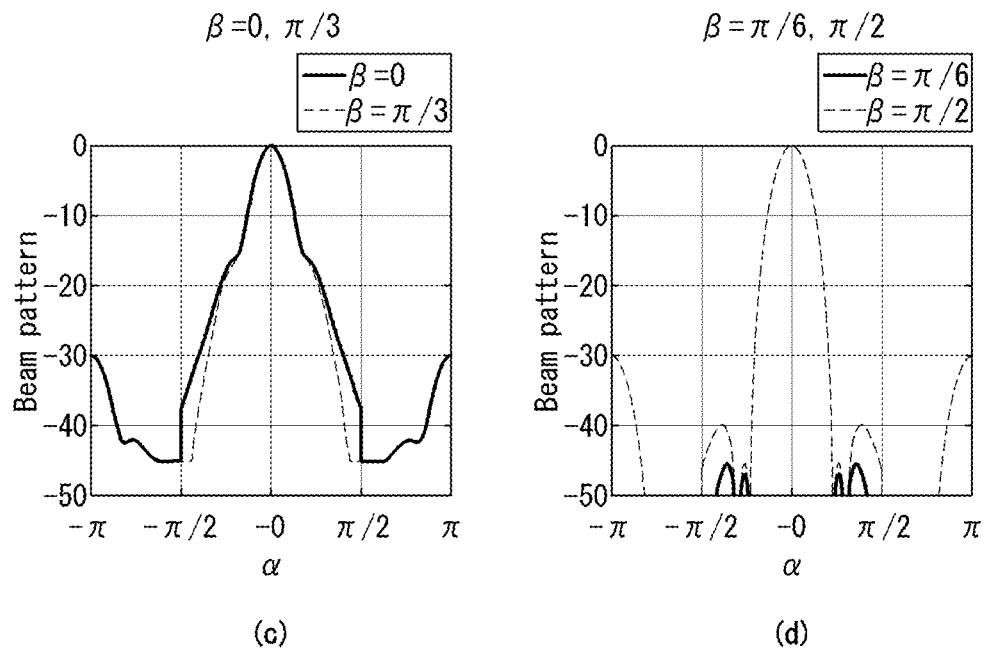
(c)  (d)

[FIG. 14]
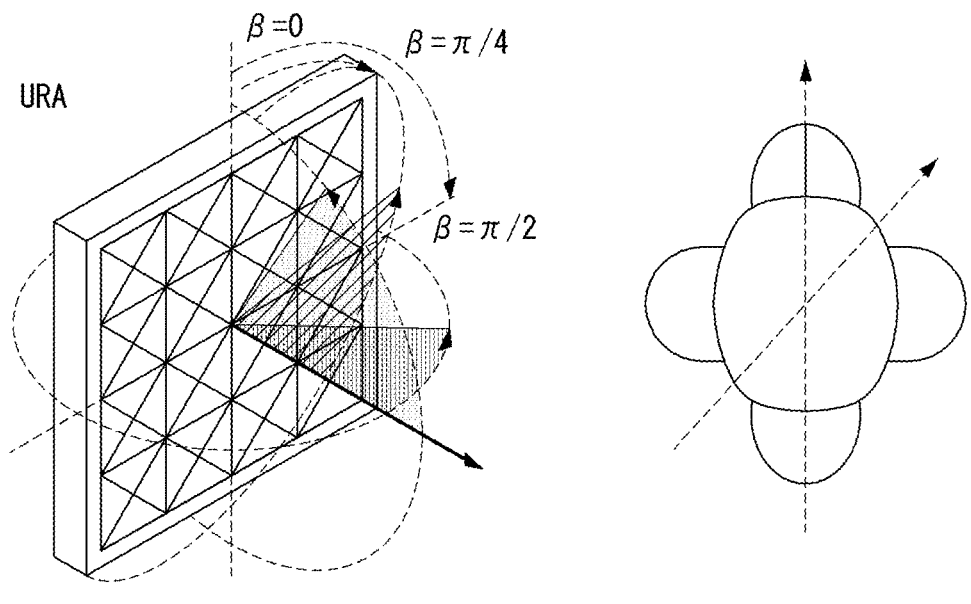
(a)　　　　　　　　　　　　　(b)
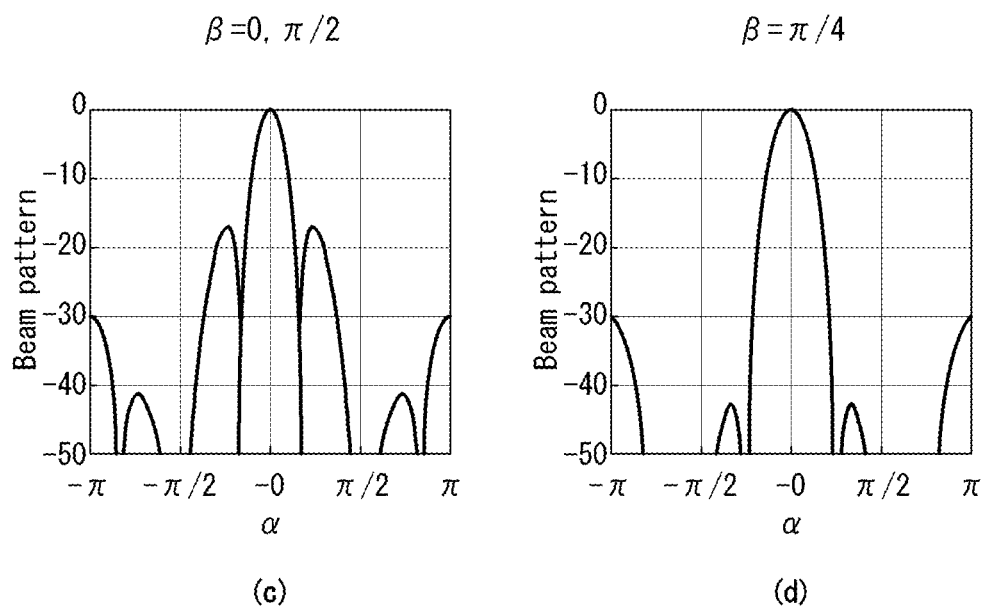
(c)　　　　　　　　　　　　　(d)

[FIG. 15]
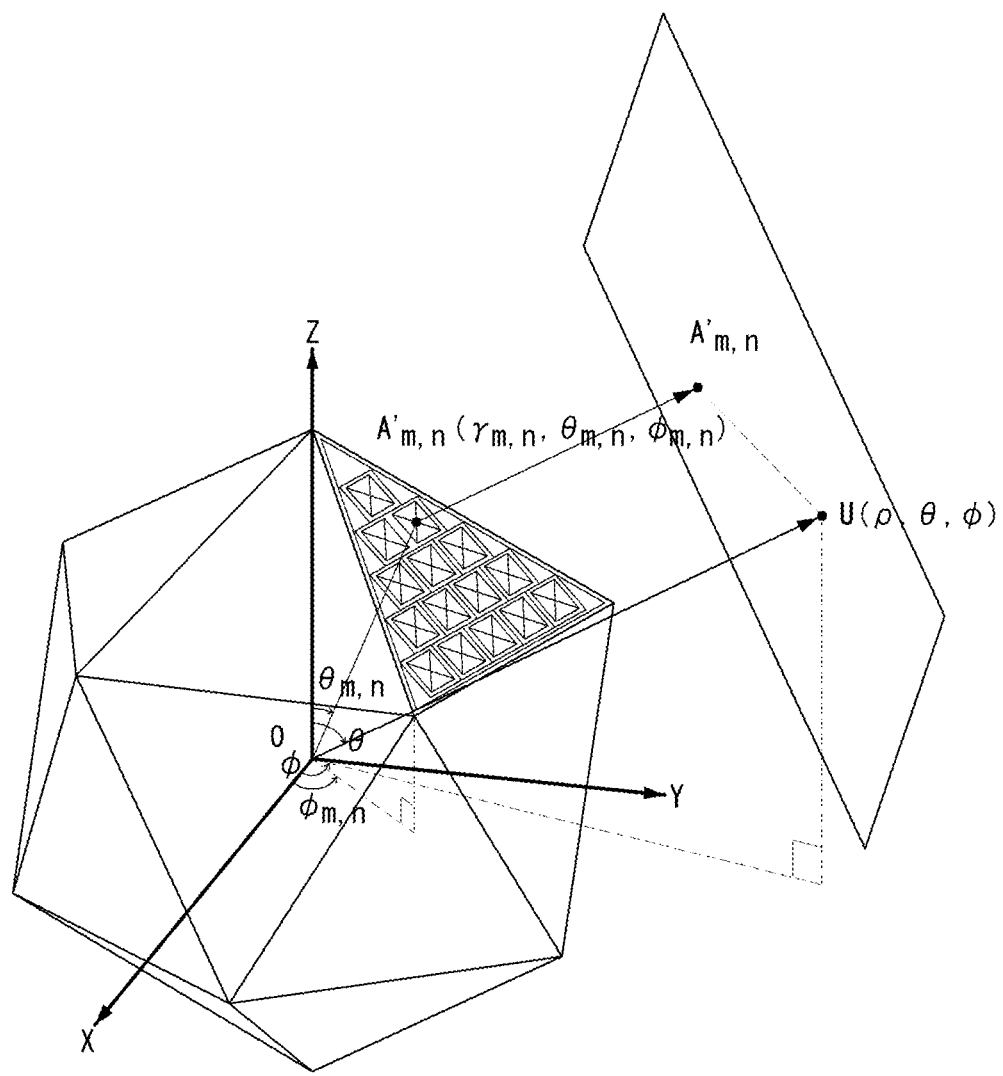

[FIG. 16]
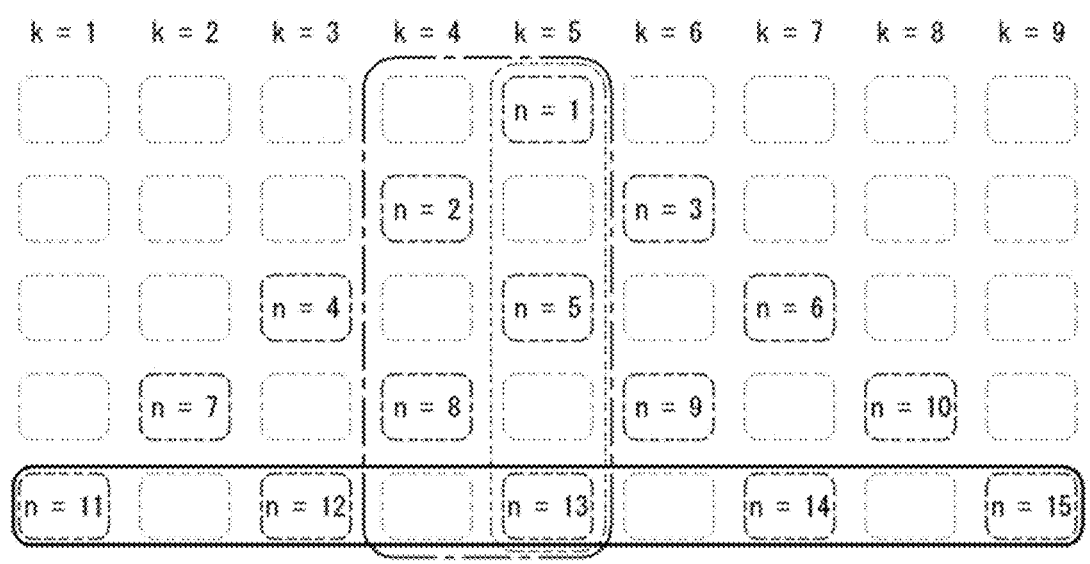

[FIG. 17]
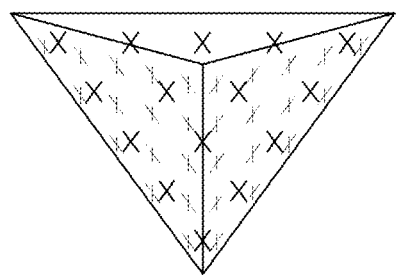
(a)
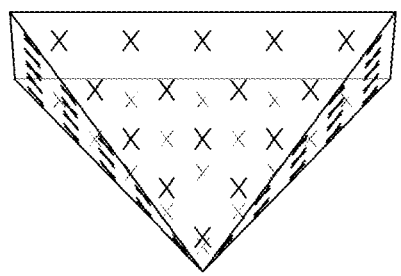
(b)
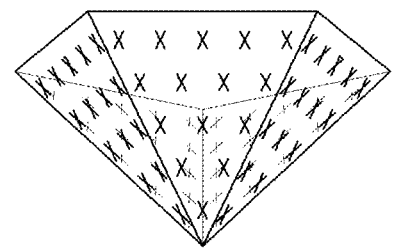
(c)

[FIG. 18]
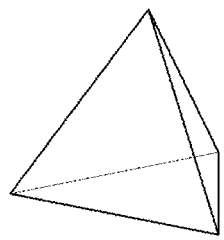
(a)
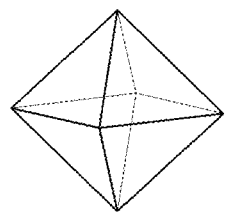
(b)
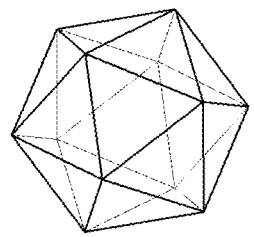
(c)
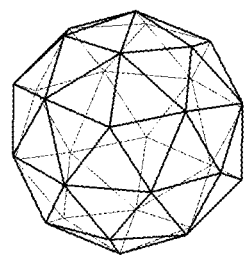
(d)

[FIG. 19]
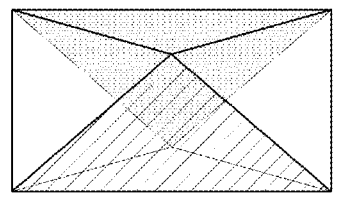
(a)
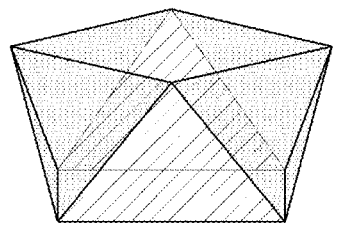
(b)
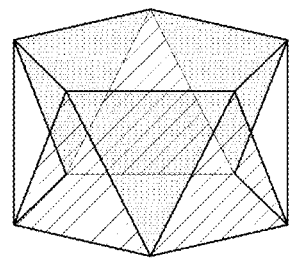
(c)

[FIG. 20]
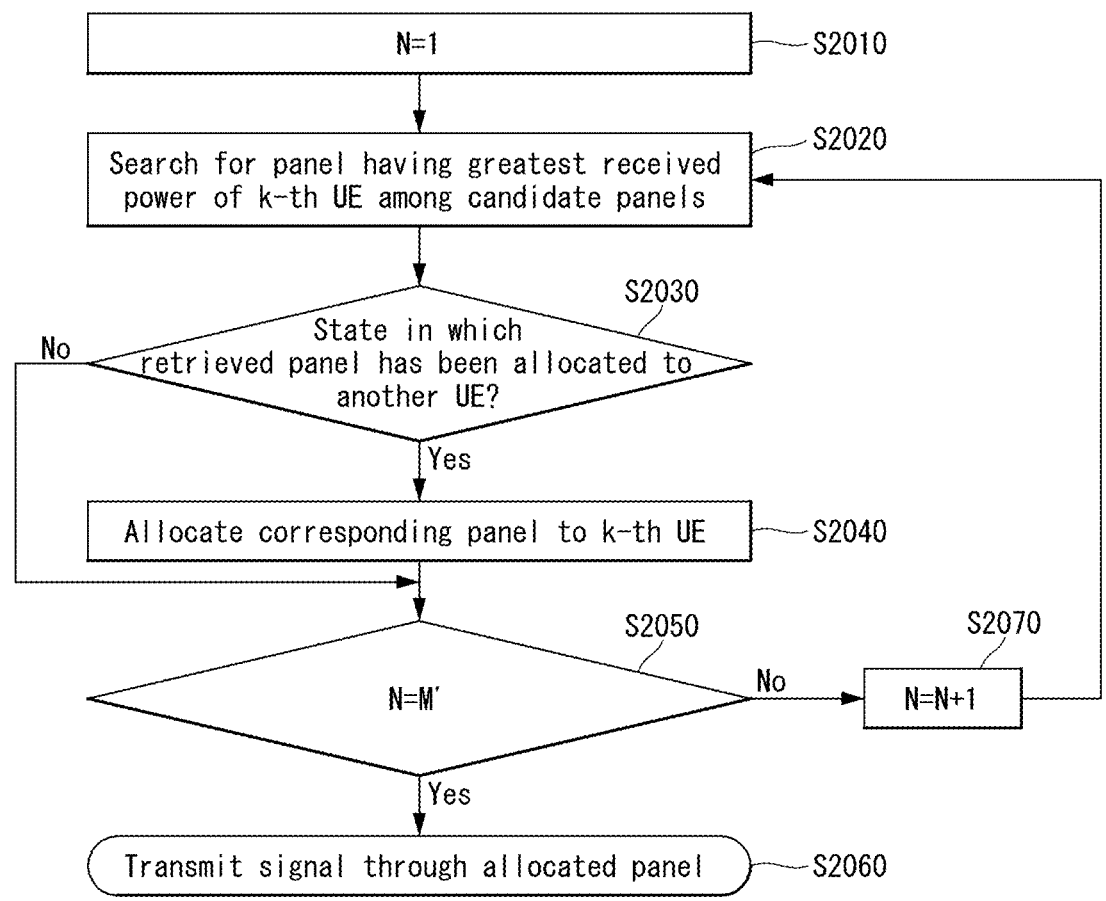

[FIG. 21]
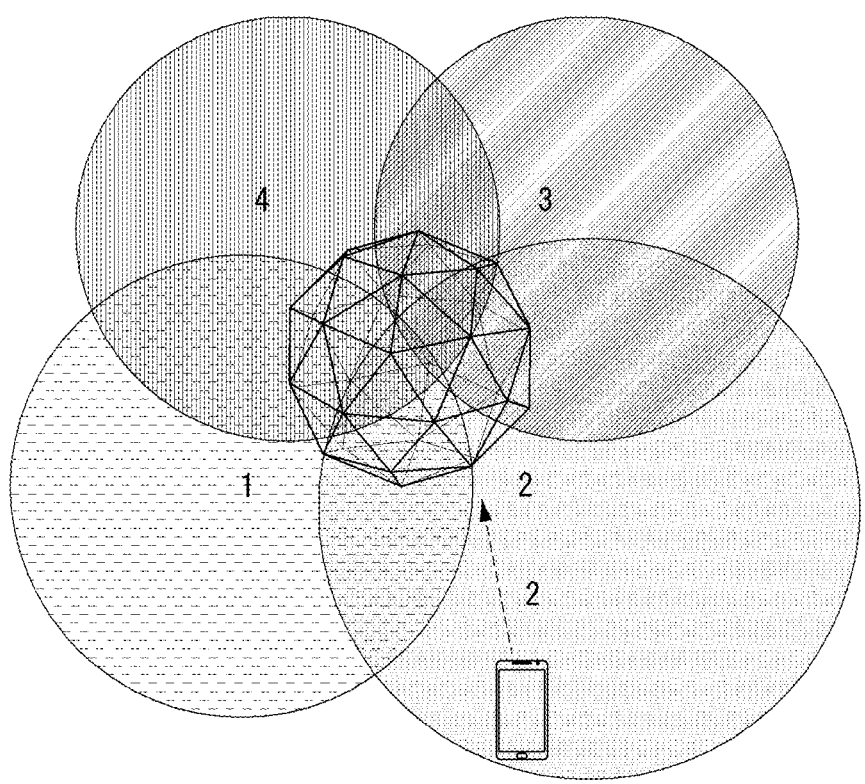

[FIG. 22]
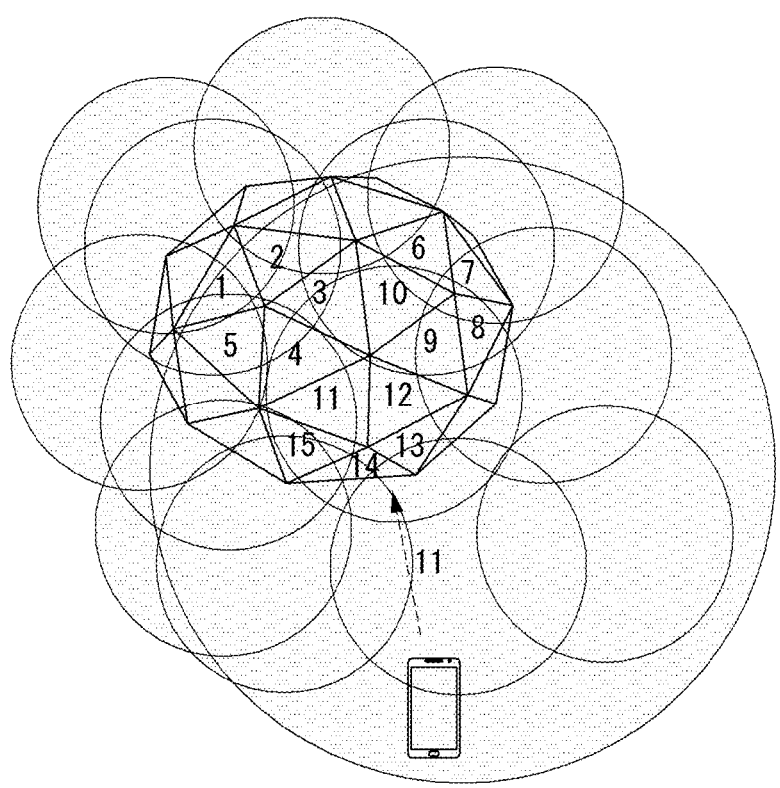

[FIG. 23]
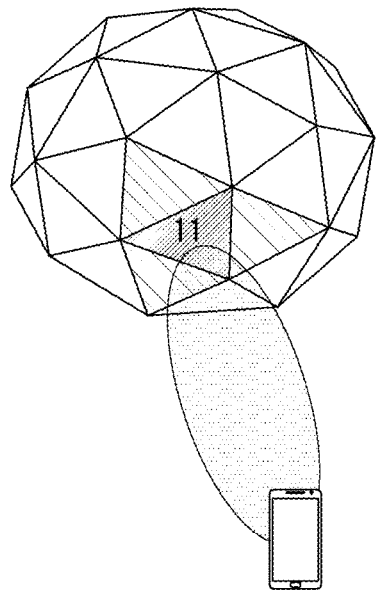
(a)
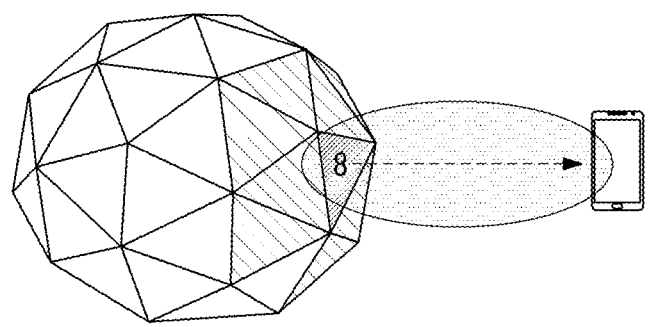
(b)

[FIG. 24]
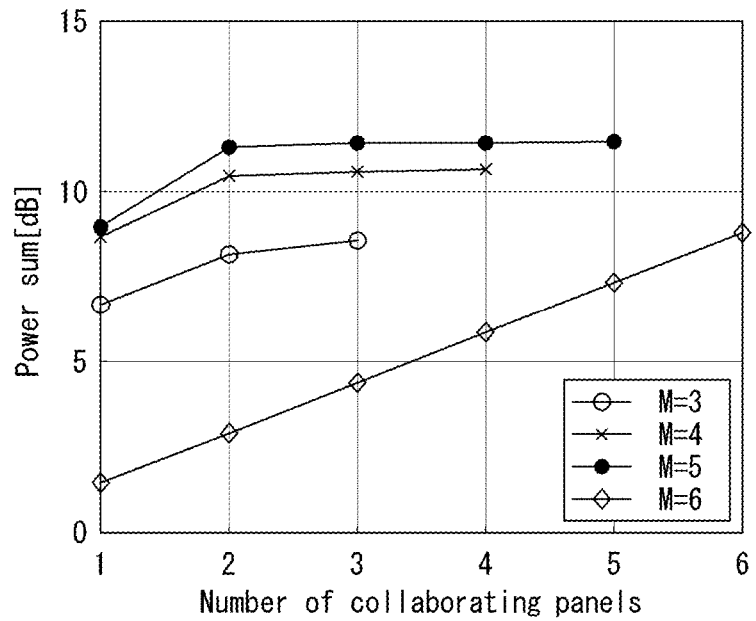
[FIG. 25]
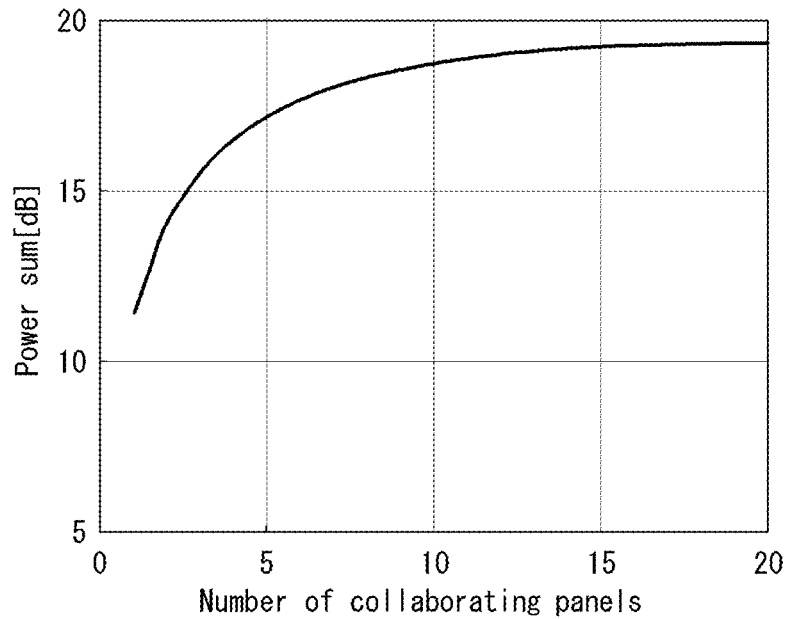

[FIG. 26]
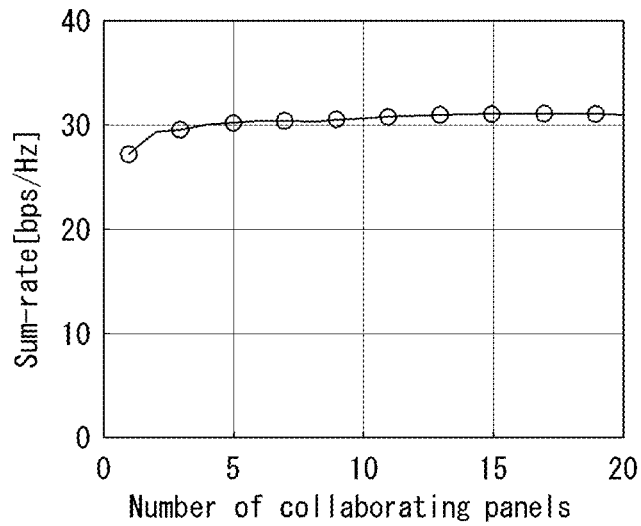
(a)
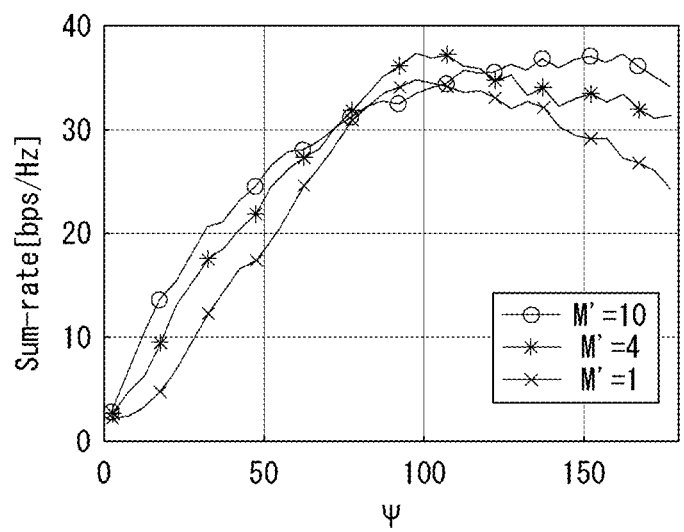
(b)

[FIG. 27]
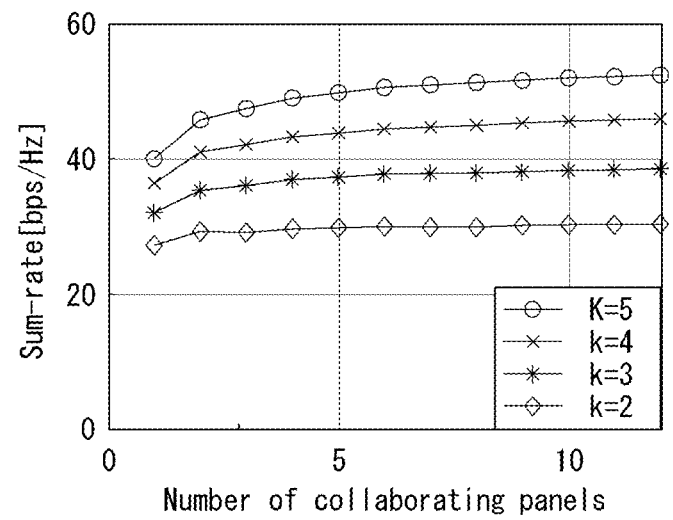
(a)
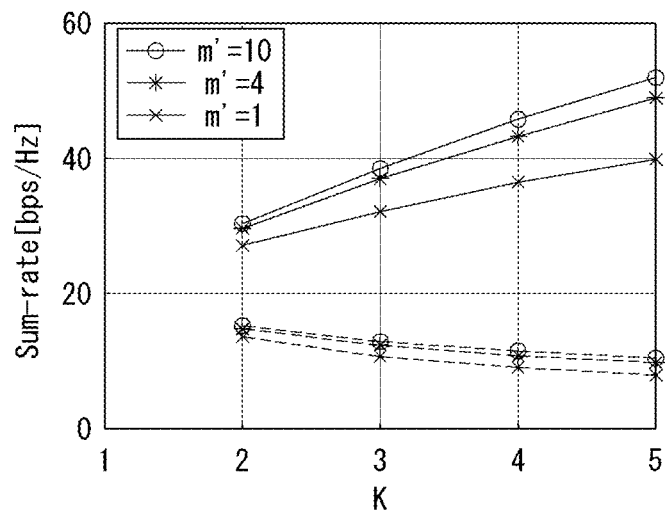
(b)

[FIG. 28]
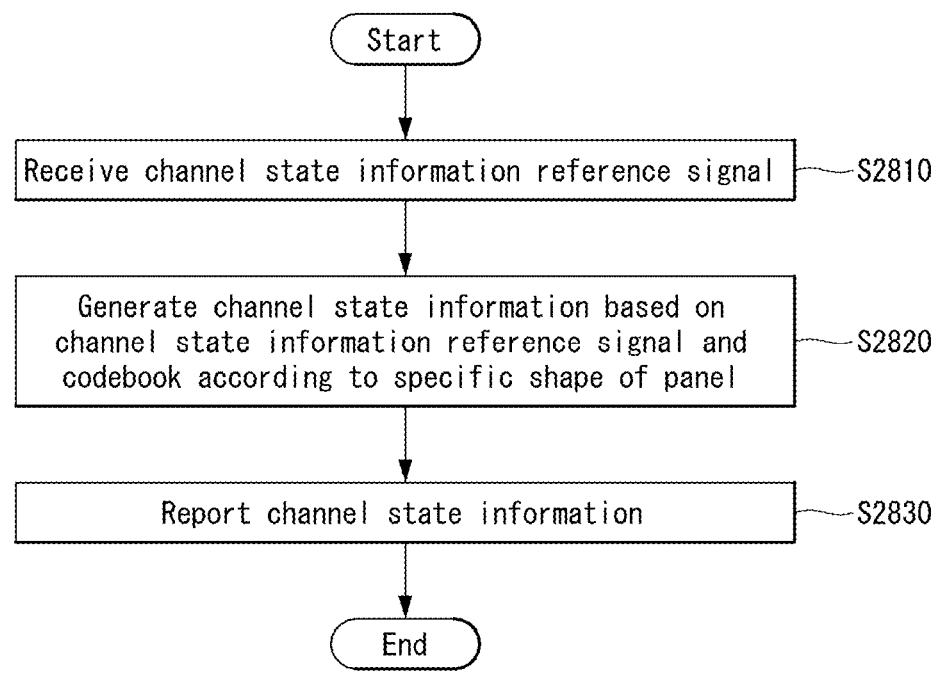

[FIG. 29]
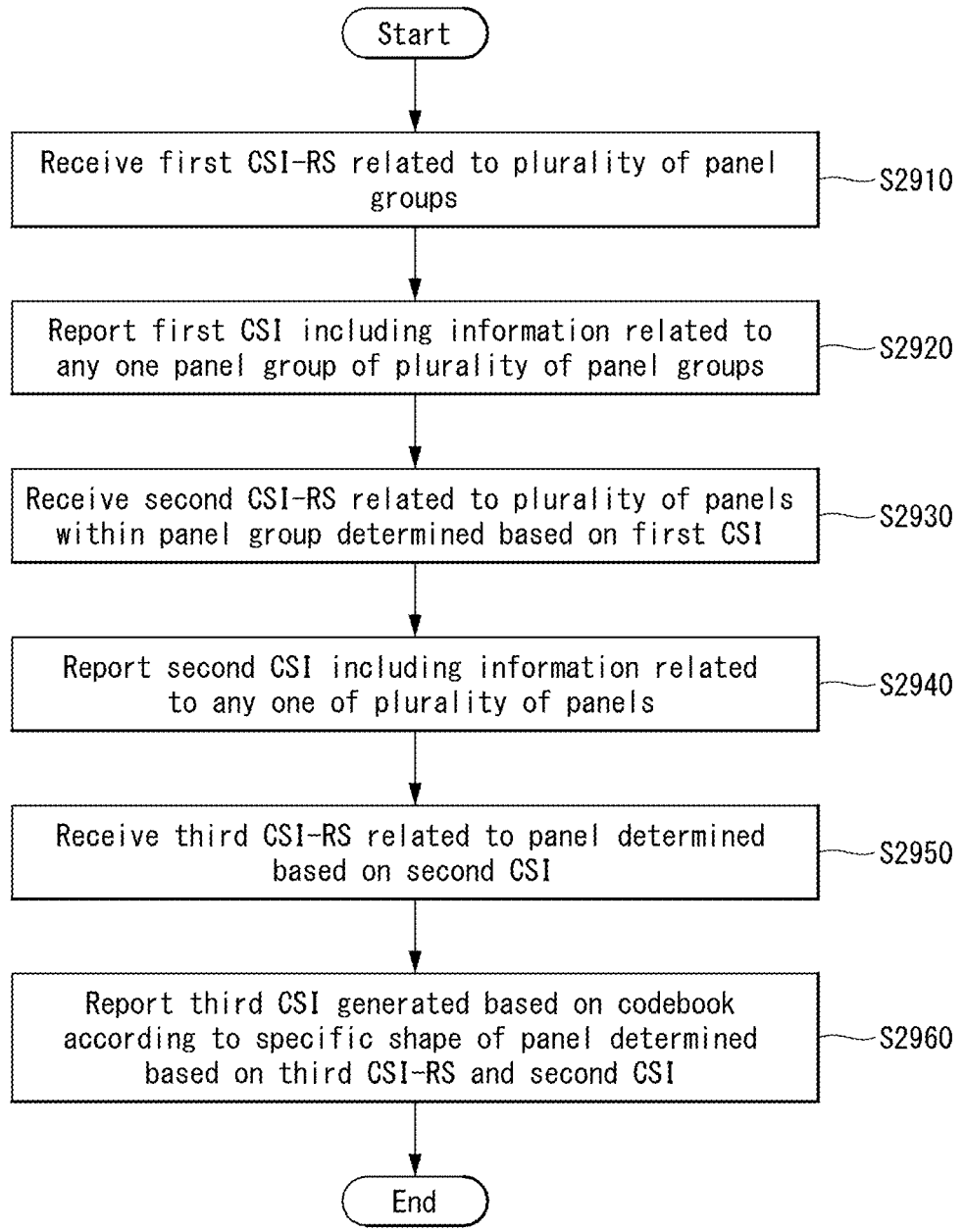

[FIG. 30]
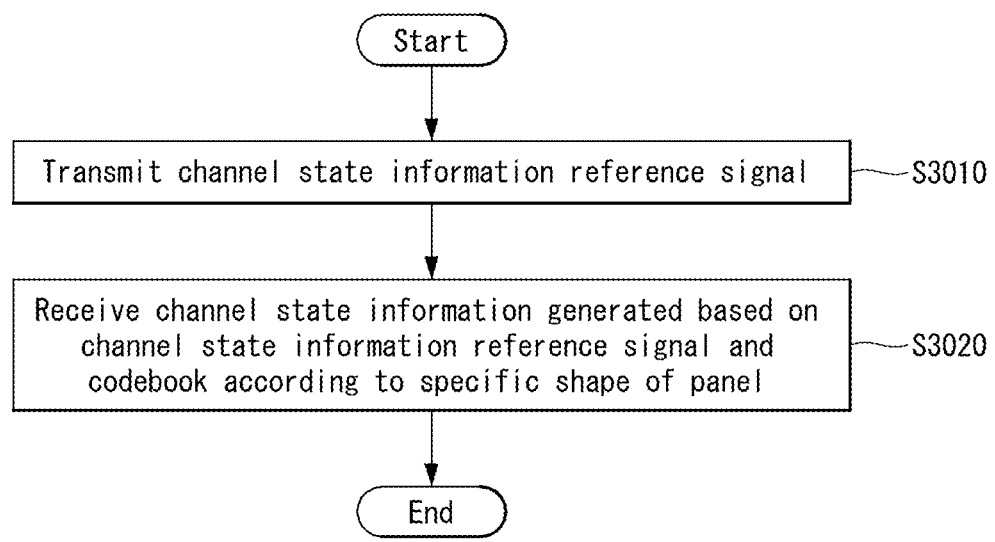

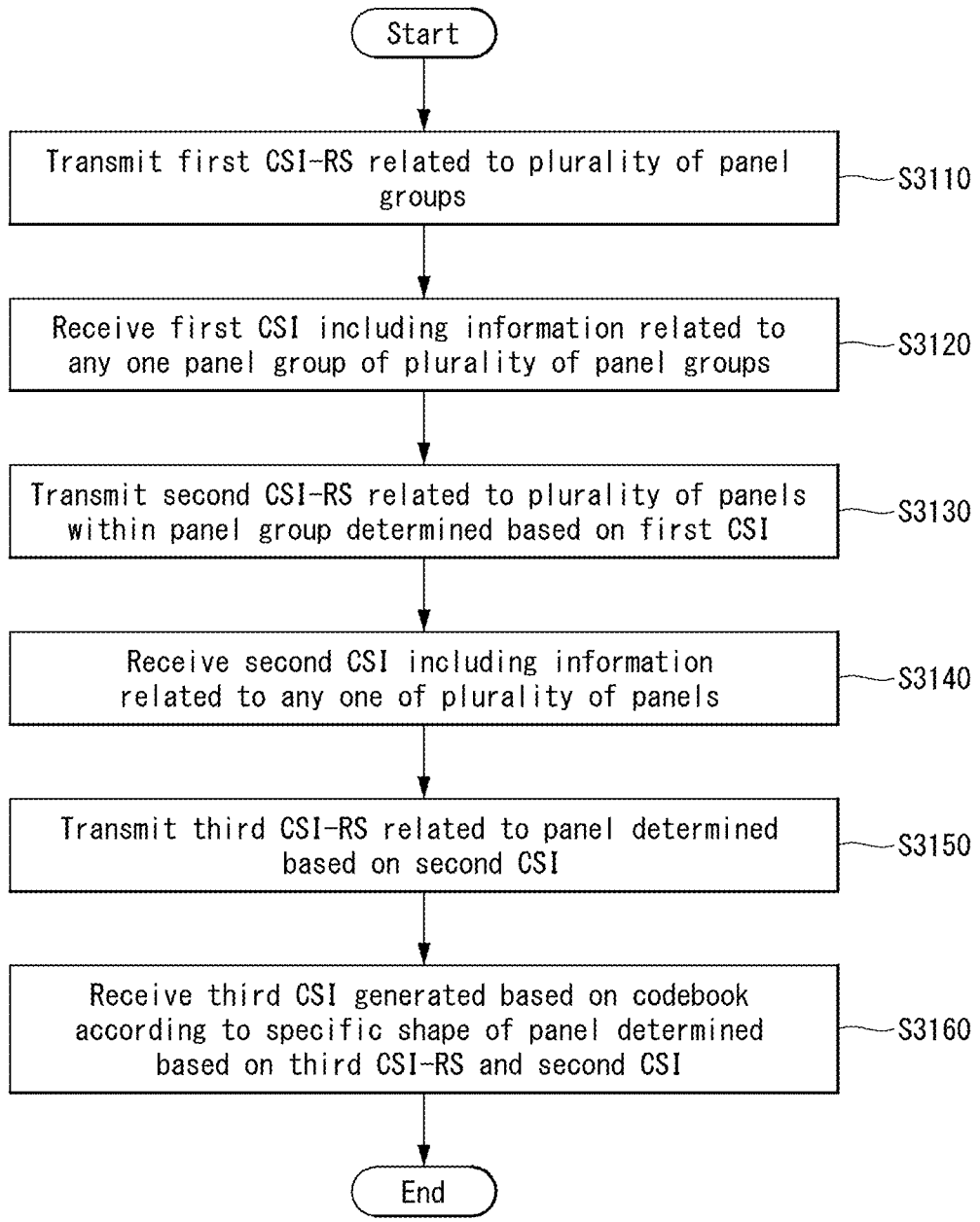
[FIG. 31]

[FIG. 32]
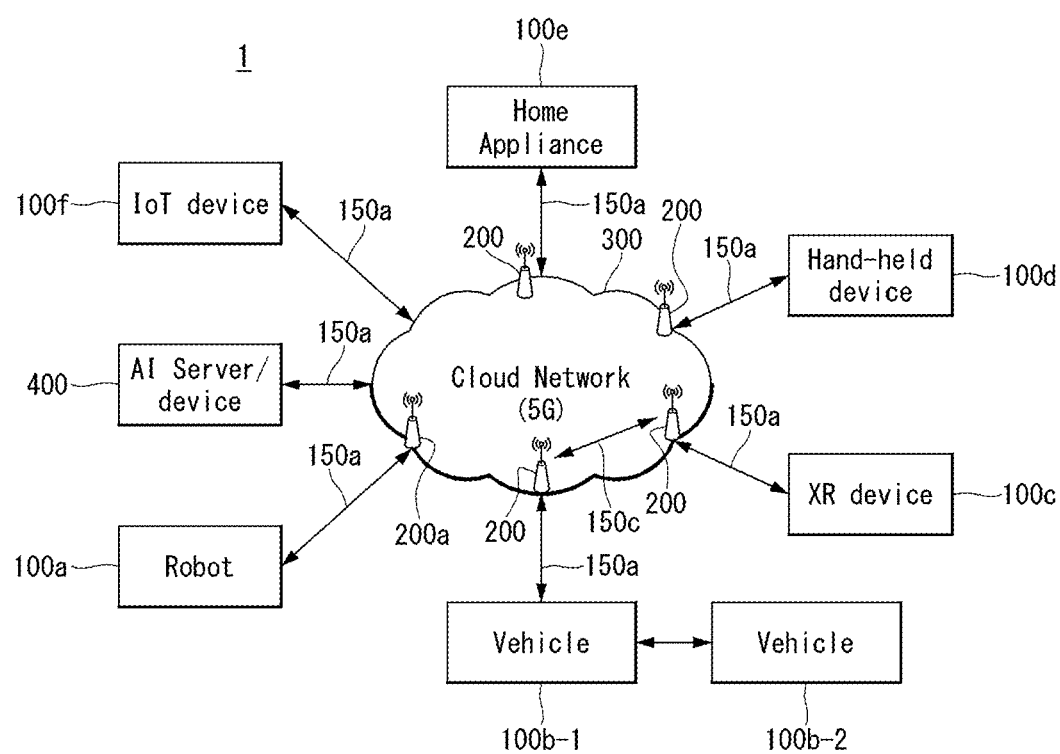

[FIG. 33]
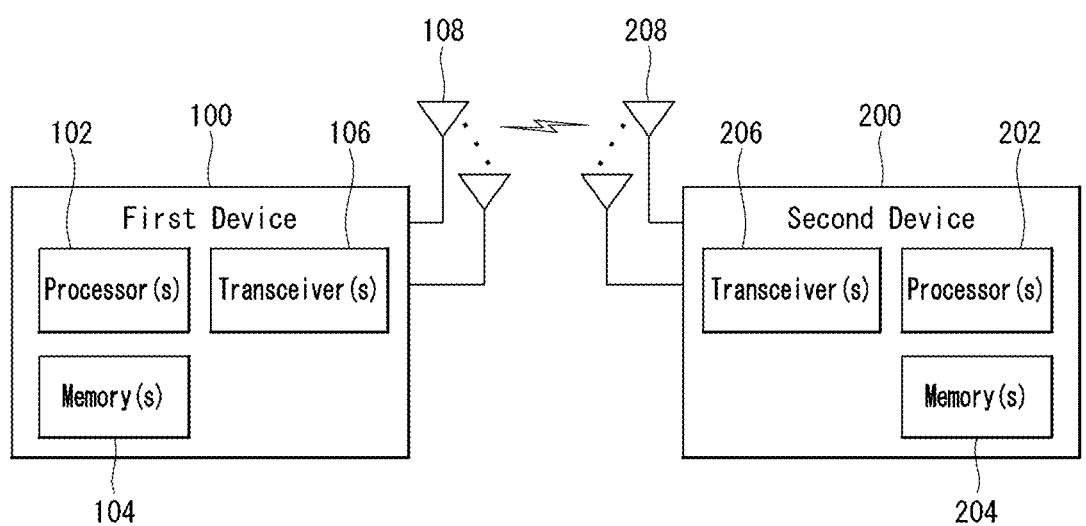

[FIG. 34]
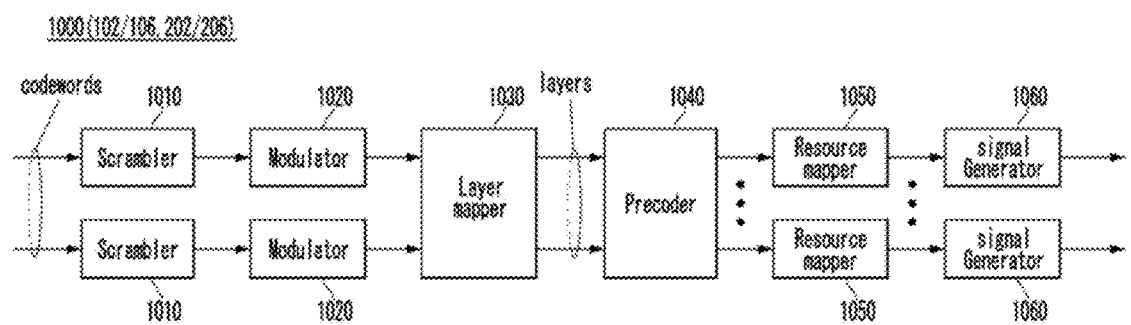

[FIG. 35]
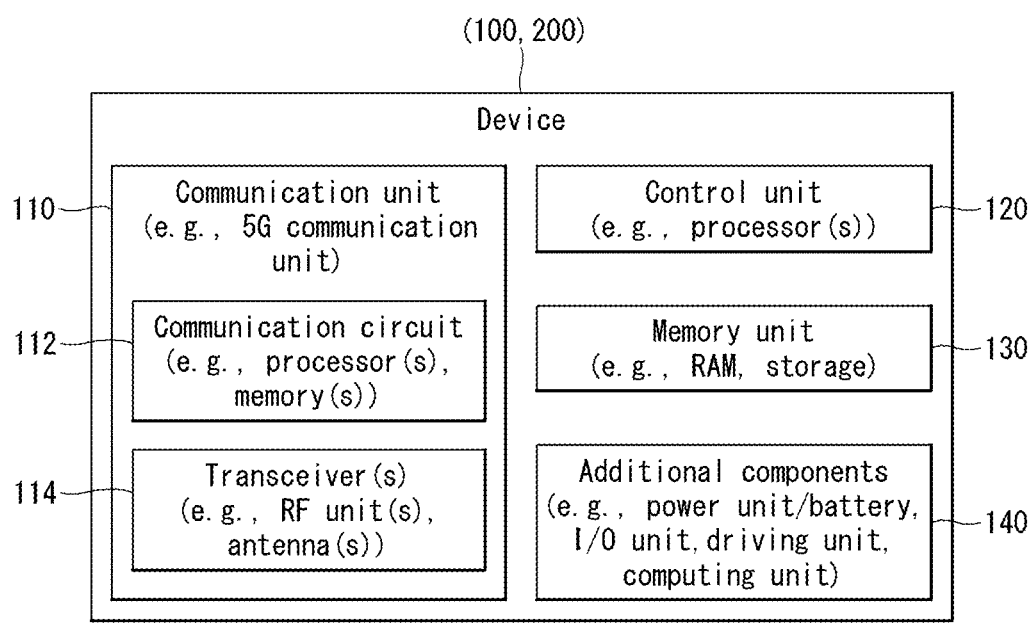

[FIG. 36]
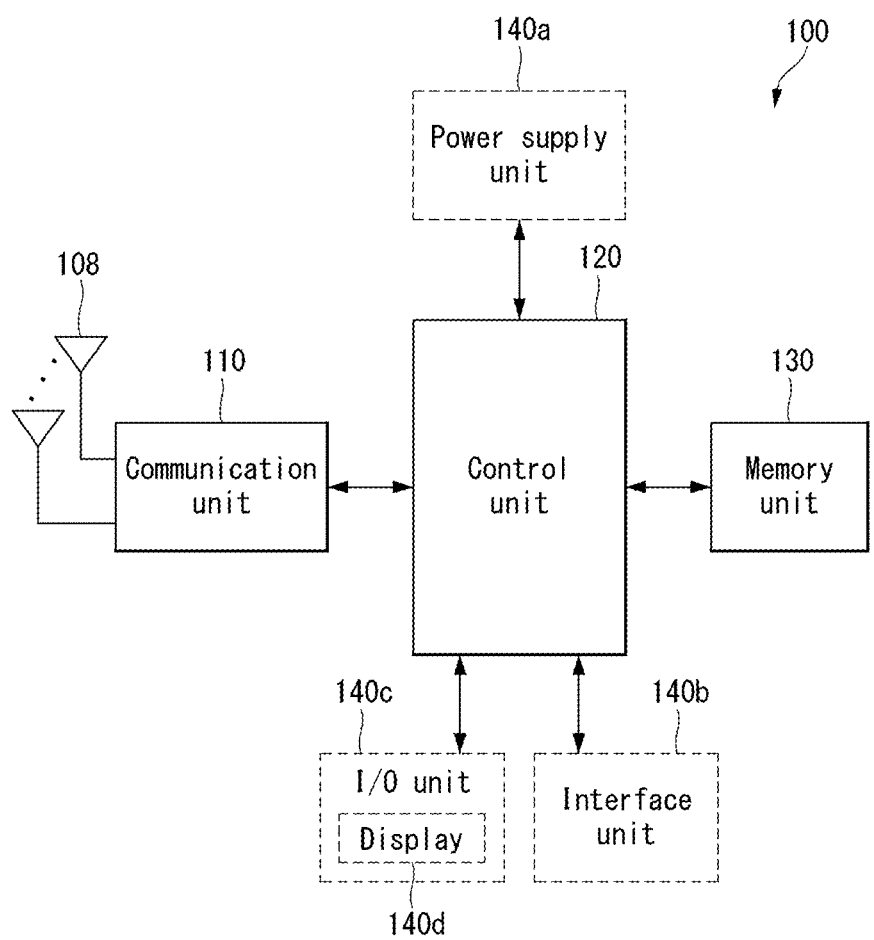

[FIG. 37]
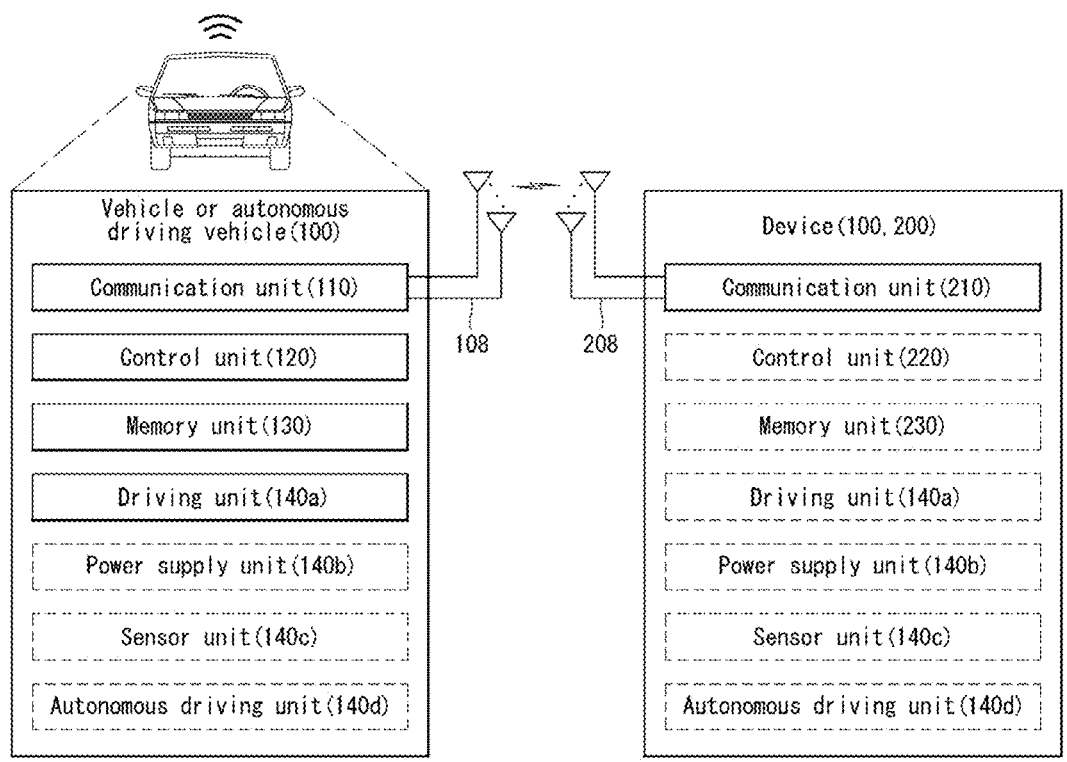

METHOD FOR REPORTING CHANNEL STATE INFORMATION BY MEANS OF TERMINAL IN WIRELESS COMMUNICATION SYSTEM, AND APPARATUS THEREFOR

This application is the National Stage filing under 35 U.S.C. 371 of International Application No. PCT/KR2019/015804, filed on Nov. 19, 2019, which claims the benefit of KR Application No. 10-2018-0147457, filed on Nov. 26, 2018, the contents of which are all hereby incorporated by reference herein in their entirety.

TECHNICAL FIELD

The present disclosure relates to a method and apparatus for reporting, by a user equipment, channel state information in a wireless communication system.

BACKGROUND ART

Mobile communication systems were developed to ensure user activity and provide voice service. However, mobile communication systems have extended their range to data service as well as voice, and currently the explosive increase in traffic is causing a lack of resources and there is a users' demand for faster services, which is creating a need for advanced mobile communication systems.

The requirements for next-generation mobile communication systems largely include coping with explosive data traffic, very high data rates per user, coping with a surprisingly large number of connected devices, very low end-to-end latency, and support for high energy efficiency. To this end, research is ongoing on a variety of technologies such as dual connectivity, massive MIMO (massive multiple input multiple output), in-band full duplex, NOMA (non-orthogonal multiple access), support for super wideband, and device networking.

DISCLOSURE

Technical Problem

An object of the present disclosure is to propose a method and apparatus for reporting channel state information by using a unit module of an antenna array which may be implemented in various forms.

Furthermore, an object of the present disclosure is to use a codebook according to a specific shape of an antenna array in order to report channel state information.

Furthermore, an object of the present disclosure is to reduce feedback overhead of channel state information when an antenna array including a plurality of panels is used to transmit a channel state information reference signal.

Furthermore, an object of the present disclosure is to report channel state information by considering the location of a UE.

Furthermore, an object of the present disclosure is to report channel state information so that efficient beamforming is performed in all directions.

Furthermore, an object of the present disclosure is to request an increase in the size of a signal through the reporting of channel state information.

Technical objects to be achieved in the present disclosure are not limited to the aforementioned technical objects, and other technical objects not described above may be evidently understood by a person having ordinary knowledge in the art to which the present disclosure pertains from the following description.

Technical Solution

A method of reporting, by a user equipment (UE), channel state information (CSI) in a wireless communication system according to an embodiment of the present disclosure includes receiving a channel state information reference signal (CSI-RS) from a base station, wherein the channel state information reference signal (CSI-RS) is related to at least one panel of an antenna array of the base station, generating channel state information (CSI) based on the channel state information reference signal (CSI-RS) and a codebook according to a specific shape of the at least one panel, and reporting the channel state information (CSI) to the base station.

The codebook may include a plurality of code vectors, the channel state information (CSI) may include information related to any one code vector of a plurality of code vectors, the code vector may include elements determined based on the specific shape among elements of a beamforming matrix generated based on a vertical beamforming vector and a horizontal beamforming vector related to the panel, and the specific shape may be a uniform triangular shape.

The length of the vertical beamforming vector may be related to the number of rows according to an arrangement of antenna elements in the panel having the uniform triangular shape, the length of the horizontal beamforming vector may be related to the number of columns according to the arrangement of the antenna elements, and the code vector may include elements determined based on a specific index according to the uniform triangular shape among the elements of the beamforming matrix.

The vertical beamforming vector satisfies the following equation.

$$a_p = [1\ e^{j2\pi p/P}\ e^{j2\pi 2p/P}\ \ldots\ e^{j2\pi(L-1)p/P}]^T, \quad \text{[Equation]}$$
$$p = 0, 1, \ldots, P-1$$

wherein $a_p$ may be the vertical beamforming vector, L may be the length of the vertical beamforming vector, p may be the index of the vertical beamforming vector, P may be the number of angles preset in relation to the vertical beamforming of the antenna array, and T may be a transpose operation.

The horizontal beamforming vector satisfies the following equation.

$$b_q = [e^{-j2\pi(L-1)q/Q}\ \ldots\ e^{-j2\pi q/Q}\ 1\ e^{j2\pi q/Q}\ \ldots\ e^{j2\pi(L-1)q/Q}]^T, \quad \text{[Equation]}$$
$$q = 0, 1, \ldots, Q-1$$

wherein $b_q$ may be the horizontal beamforming vector, L may be the length of the vertical beamforming vector, the length of the horizontal beamforming vector may be 2L−1, q may be the index of the horizontal beamforming vector, Q may be the number of angles preset in relation to the horizontal beamforming of the antenna array, and T may be a transpose operation.

The beamforming matrix satisfies the following equation.

$$C_{p,q} = a_p b_q^T \quad \text{[Equation]}$$

wherein $C_{p,q}$ may be the beamforming matrix, and T may be a transpose operation.

The code vector includes elements determined based on the specific index (l,k) among the elements of the beamforming matrix $C_{p,q}$. The specific index (l,k) satisfies the following equation.

$$l = x, \text{ if } \frac{x(x-1)}{2} < n \leq \frac{x(x+1)}{2}, k = L - l^2 + 2n - 1 \quad \text{[Equation]}$$

wherein l is 1≤l≤L, and L may be the length of the vertical beamforming vector.

The codebook C satisfies the following equation.

$$C = [c_{1,1} \ c_{1,2} \ \ldots \ c_{1,Q} \ c_{2,1} \ c_{2,2} \ \ldots \ c_{2,Q} \ \ldots \ c_{P,1} \ c_{P,2} \ \ldots \ c_{P,Q}] \quad \text{[Equation]}$$

wherein $c_{p,q}$ may be a code vector according to the index p of the vertical beamforming vector and the index q of the horizontal beamforming vector.

The channel state information (CSI) may include at least one of the index p of the vertical beamforming vector or the index q of the horizontal beamforming vector.

A method of reporting, by a user equipment (UE), channel state information (CSI) in a wireless communication system according to another embodiment of the present disclosure includes receiving, from a base station, a first channel state information reference signal (CSI-RS) related to a plurality of panel groups of an antenna array of the base station, reporting, to the base station, first CSI including information related to any one panel group of the plurality of panel groups, receiving, from the base station, a second CSI-RS related to a plurality of panels within a panel group determined based on the first CSI, reporting, to the base station, second CSI including information related to any one panel of the plurality of panels, receiving, from the base station, a third CSI-RS related to a panel determined based on the second CSI, and reporting, to the base station, third CSI generated based on the third CSI-RS and a codebook according to a specific shape of the panel determined based on the second CSI.

The codebook may include a plurality of code vectors, the third CSI may include information related to any one code vector of the plurality of code vectors, the code vector may include elements determined based on the specific shape among elements of a beamforming matrix generated based on a vertical beamforming vector and a horizontal beamforming vector related to the determined panel, the specific shape may be a uniform triangular shape, and a shape of the antenna array may be a three-dimensional shape having one face related to each of a plurality of panels each having the uniform triangular shape.

The third CSI-RS may be related to a plurality of collaborating panels including the panel, determined based on the second CSI, as a center panel, and the third CSI may further include information related to the center panel changed based on a location of the UE among the plurality of collaborating panels.

The third CSI may include a power boost request (PBR) related to an increase in the number of plurality of collaborating panels.

The length of the vertical beamforming vector may be related to the number of rows according to an arrangement of antenna elements in the panel having the uniform triangular shape. The length of the horizontal beamforming vector may be related to the number of columns according to the arrangement of the antenna elements. The code vector may include elements determined based on a specific index according to the uniform triangular shape among the elements of the beamforming matrix.

A user equipment (UE) reporting channel state information (CSI) in a wireless communication system according to still another embodiment of the present disclosure includes a transceiver, a memory, and a processor connected to the transceiver and the memory. The processor is configured to receive a channel state information reference signal (CSI-RS) from a base station, wherein the channel state information reference signal (CSI-RS) may be related to at least one panel of an antenna array of the base station, generate channel state information (CSI) based on the channel state information reference signal (CSI-RS) and a codebook according to a specific shape of the at least one panel, and report the channel state information (CSI) to the base station.

The codebook may include a plurality of code vectors. The channel state information (CSI) may include information related to any one code vector of a plurality of code vectors. The code vector may include elements determined based on the specific shape among elements of a beamforming matrix generated based on a vertical beamforming vector and a horizontal beamforming vector related to the panel. The specific shape may be a uniform triangular shape.

The length of the vertical beamforming vector may be related to the number of rows according to an arrangement of antenna elements in the panel having the uniform triangular shape. The length of the horizontal beamforming vector may be related to the number of columns according to the arrangement of the antenna elements. The code vector may include elements determined based on a specific index according to the uniform triangular shape among the elements of the beamforming matrix.

The vertical beamforming vector satisfies the following equation.

$$a_p = [1 \ e^{j2\pi p/P} \ e^{j2\pi 2p/P} \ \ldots \ e^{j2\pi(L-1)p/P}]^T, p = 0, 1, \ldots, P-1 \quad \text{[Equation]}$$

wherein $a_p$ may be the vertical beamforming vector, L may be the length of the vertical beamforming vector, p may be the index of the vertical beamforming vector, P may be the number of angles preset in relation to the vertical beamforming of the antenna array, and T may be a transpose operation.

The horizontal beamforming vector satisfies the following equation.

$$b_q = [e^{-j2\pi(L-1)q/Q} \ \ldots \ e^{-j2\pi q/Q} 1 \ e^{j2\pi q/Q} \ \ldots \ e^{j2\pi(L-1)q/Q}]^T, \quad \text{[Equation]}$$
$$q = 0, 1, \ldots, Q-1$$

wherein $b_q$ may be the horizontal beamforming vector, L may be the length of the vertical beamforming vector, the length of the horizontal beamforming vector may be 2L-1, q may be the index of the horizontal beamforming vector, Q may be the number of angles preset in relation to the horizontal beamforming of the antenna array, and T may be a transpose operation.

The beamforming matrix satisfies the following equation.

$$C_{p,q} = a_p b_q^T \quad \text{[Equation]}$$

wherein $C_{p,q}$ may be the beamforming matrix, and T may be a transpose operation.

The code vector may include elements determined based on the specific index (l,k) among the elements of the beamforming matrix $C_{p,q}$, and the specific index (l,k) may satisfy an equation below.

$$l = x, \text{ if } \frac{x(x-1)}{2} < n \le \frac{x(x+1)}{2}, k = L - l^2 + 2n - 1 \quad \text{[Equation]}$$

wherein l is $1 \le l \le L$, and L may be the length of the vertical beamforming vector.

Advantageous Effects

According to an embodiment of the present disclosure, a UE generates channel state information based on a codebook according to a specific shape of at least one panel of an antenna array. The specific shape is a uniform triangular shape. The antenna array may be implemented in various three-dimensional shapes by the uniform triangular shape. Accordingly, according to the present disclosure, although the antenna array of a base station is implemented in various three-dimensional shapes, efficient beamforming can be performed because channel state information generated based on a codebook is reported.

Furthermore, according to an embodiment of the present disclosure, the codebook includes a plurality of code vectors. The code vector includes elements determined based on the specific shape, among elements of a beamforming matrix generated based on a vertical beamforming vector and a horizontal beamforming vector related to the panel. Accordingly, the present disclosure can generate channel state information suitable for a shape of a panel included in an antenna array.

Furthermore, according to an embodiment of the present disclosure, if an antenna array of a base station includes a plurality of panels, a UE reports first to third CSI with respect to first to third CSI-RSs that are sequentially transmitted. Any one of the plurality of panels is determined through such sequential signaling.

If one panel of the plurality of panels is determined through one signaling, feedback resources used for the reporting of channel state information may be greatly increased due to an increase in the number of plurality of panels and the number of antenna elements included in each panel. In contrast, the present disclosure can reduce feedback overhead of channel state information through sequential signaling.

Furthermore, according to an embodiment of the present disclosure, the third CSI further includes information related to a center panel changed based on the location of a UE among a plurality of collaborating panels. Accordingly, adaptive beamforming can be performed in response to a change in the location of the UE.

Furthermore, according to an embodiment of the present disclosure, a shape of the antenna array is a three-dimensional shape having one face related to each of a plurality of panels each having the uniform triangular shape. A UE reports channel state information suitable for the shape of the antenna array. Accordingly, according to the present disclosure, efficient beamforming can be performed in a direction where a UE capable of moving to various locations, such as a drone, is located.

Furthermore, according to an embodiment of the present disclosure, the third CSI includes a power boost request (PBR) related to an increase in the number of plurality of collaborating panels. Signal quality is improved because the number of collaborating panels that transmit signals to a UE is increased due to the third CSI. Accordingly, if a plurality of panels is included in an antenna array of a base station, all the panels are not used, but a proper number of panels in which signal quality is considered are used. Unused panels may be used for another UE. Accordingly, the present disclosure can use a plurality of panels more efficiently in a communication environment in which a plurality of UEs is present.

Effects which may be obtained in the present disclosure are not limited to the aforementioned effects, and other technical effects not described above may be evidently understood by a person having ordinary knowledge in the art to which the present disclosure pertains from the following description.

DESCRIPTION OF DRAWINGS

The accompany drawings, which are included to provide a further understanding of the present disclosure and are incorporated on and constitute a part of this specification illustrate embodiments of the present disclosure and together with the description serve to explain the principles of the present disclosure.

FIG. 1 is a diagram showing an example of an LTE radio frame structure.

FIG. 2 is a diagram showing an example of a resource grid for a downlink slot.

FIG. 3 shows an example of a downlink subframe structure.

FIG. 4 shows an example of an uplink subframe structure.

FIG. 5 illustrates a configuration of a general multiple-input multiple-output (MIMO) antenna communication system.

FIG. 6 illustrates channels from multiple transmit (Tx) antennas to a single reception (Rx) antenna.

FIG. 7 illustrates a downlink HARQ process in an LTE FDD system to which the present disclosure is applicable.

FIG. 8 illustrates an uplink HARQ process in an LTE FDD system to which the present disclosure is applicable.

FIG. 9 illustrates reference signal patterns mapped to downlink resource block pairs in a wireless communication system to which the present disclosure is applicable.

FIG. 10 illustrates a periodic CSI-RS transmission scheme in a wireless communication system to which the present disclosure is applicable.

FIG. 11 illustrates an aperiodic CSI-RS transmission scheme in a wireless communication system to which the present disclosure is applicable.

FIG. 12 illustrates the architecture of a uniform triangular array according to an embodiment of the present disclosure.

FIGS. 13 and 14 are diagrams for comparing a beam pattern according to a uniform triangular array according to an embodiment of the present disclosure and a beam pattern having a uniform rectangular array.

FIG. 15 is a diagram illustrating a three-dimensional antenna composed of a panel having a uniform triangular array according to an embodiment of the present disclosure and the location of a UE based on a polar coordinate system.

FIG. 16 is a diagram for describing a code vector configuration for a uniform triangular array according to an embodiment of the present disclosure.

FIG. 17 is an example of three-dimensional antenna structures using uniform triangular arrays according to an embodiment of the present disclosure.

FIG. 18 is another example of three-dimensional antenna structures using uniform triangular arrays according to an embodiment of the present disclosure.

FIG. 19 is still another example of three-dimensional antenna structures using uniform triangular arrays according to an embodiment of the present disclosure.

FIG. 20 is a flowchart for describing an algorithm related to panel allocation when a signal is transmitted to a plurality of UEs according to an embodiment of the present disclosure.

FIGS. 21 to 23 are diagrams for describing sequential signaling for determining a specific panel in an antenna array including a plurality of panels according to an embodiment of the present disclosure.

FIGS. 24 to 25 are graphs illustrating received power performance according to a change in the number of collaborating panels when an antenna structure is used according to an embodiment of the present disclosure.

FIG. 26 is a graph illustrating sum transfer rates according to a change in the number and location of collaborating panels when a signal is transmitted to a plurality of UEs according to an embodiment of the present disclosure.

FIG. 27 is a graph illustrating sum transfer rates according to a change in the number of collaborating panels and the number of UEs when a signal is transmitted to a plurality of the UEs according to an embodiment of the present disclosure.

FIG. 28 is a flowchart for describing a method of reporting, by a UE, channel state information according to an embodiment of the present disclosure.

FIG. 29 is a flowchart for describing a method of reporting, by a UE, channel state information according to another embodiment of the present disclosure.

FIG. 30 is a flowchart for describing a method of receiving, by a base station, channel state information according to an embodiment of the present disclosure.

FIG. 31 is a flowchart for describing a method of receiving, by a base station, channel state information according to another embodiment of the present disclosure.

FIG. 32 illustrates a communication system 1 applied to the present disclosure.

FIG. 33 illustrates a wireless device applicable to the present disclosure.

FIG. 34 illustrates a signal processing circuit applied to the present disclosure.

FIG. 35 illustrates another example of a wireless device applied to the present disclosure.

FIG. 36 illustrates a portable device applied to the present disclosure.

FIG. 37 illustrates a vehicle or a self-driving vehicle applied to the present disclosure.

MODE FOR INVENTION

Reference will now be made in detail to the preferred embodiments of the present disclosure, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present disclosure. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present disclosure.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and these specific terms may be replaced with other terms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as Universal Terrestrial Radio Access (UTRA) or CDMA2000. The TDMA may be implemented with a radio technology such as Global System for Mobile communications (GSM)/General Packet Radio Service (GPRS)/Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink and employs the SC-FDMA in uplink. LTE-advanced (LTE-A) is an evolution of the 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

For clarity, this application focuses on the 3GPP LTE/LTE-A. However, technical features of the present disclosure are not limited thereto.

LTE System in General

FIG. 1 is a diagram showing an example of an LTE radio frame structure.

In FIG. 1, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

FIG. 2 is a diagram showing an example of a resource grid for a downlink slot.

In FIG. 2, a downlink slot includes a plurality of OFDM symbols in time domain. It is described herein that one downlink slot includes 7 OFDM symbols, and one resource block (RB) includes 12 subcarriers in frequency domain as an example. However, the present disclosure is not limited thereto. Each element on the resource grid is referred to as a resource element (RE). One RB includes 12×7 REs. The number NDL of RBs included in the downlink slot depends on a downlink transmit bandwidth. The structure of an uplink slot may be same as that of the downlink slot.

FIG. 3 shows an example of a downlink subframe structure.

In FIG. 3, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

FIG. 4 shows an example of an uplink subframe structure.

In FIG. 4, an uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Hereinafter, an LTE frame structure is described more specifically.

Throughout LTE specification, unless otherwise noted, the size of various fields in the time domain is expressed as a number of time units $T_s=1/(15000 \times 2048)$ seconds.

Downlink and uplink transmissions are organized into radio frames with $T_f=307200 \times T_s=10$ ms duration. Two radio frame structures are supported:

Type 1: applicable to FDD
Type 2: applicable to TDD
Frame Structure Type 1

Frame structure type 1 is applicable to both full duplex and half duplex FDD. Each radio frame is $T_f=307200 \cdot T_s=10$ ms long and consists of 20 slots of length $T_{slot}=15360 \cdot T_s=0.5$ ms, numbered from 0 to 19. A subframe is defined as two consecutive slots where subframe i consists of slots 2i and 2i+1.

For FDD, 10 subframes are available for downlink transmission and 10 subframes are available for uplink transmissions in each 10 ms interval.

Uplink and downlink transmissions are separated in the frequency domain. In half-duplex FDD operation, the UE cannot transmit and receive at the same time while there are no such restrictions in full-duplex FDD.

Multi-Input Multi-Output (MIMO)

An MIMO technology uses multiple transmitting (Tx) antennas and multiple receiving (Rx) antennas by breaking from generally one transmitting antenna and one receiving antenna up to now. In other words, the MIMO technology is a technology for achieving capacity increment or capability enhancement by using a multiple input multiple output antenna at a transmitter side or a receiver side of the wireless communication system. Hereinafter, "MIMO" will be referred to as "multiple input multiple output antenna".

More specifically, the MIMO technology does not depend on one antenna path in order to receive one total message and completes total data by collecting a plurality of data pieces received through multiple antennas. Consequently, the MIMO technology may increase a data transfer rate within in a specific system range and further, increase the system range through a specific data transfer rate.

In next-generation mobile communication, since a still higher data transfer rate than the existing mobile communication is required, it is anticipated that an efficient multiple input multiple output technology is particularly required. In such a situation, an MIMO communication technology is a next-generation mobile communication technology which may be widely used in a mobile communication terminal and a relay and attracts a concern as a technology to overcome a limit of a transmission amount of another mobile communication according to a limit situation due to data communication extension, and the like.

Meanwhile, the multiple input multiple output (MIMO) technology among various transmission efficiency improvement technologies which have been researched in recent years as a method that may greatly improve a communication capacity and transmission and reception performance without additional frequency allocation or power increment has the largest attention in recent years.

FIG. 5 is a configuration diagram of a general multiple input multiple output (MIMO) communication system.

Referring to FIG. 5, when the number of transmitting antennas increases to NT and the number of receiving antennas increases to NR at the same time, since a theoretical channel transmission capacity increases in proportion to the number of antennas unlike a case using multiple antennas only in a transmitter or a receiver, a transfer rate may be improved and frequency efficiency may be greatly improved. In this case, the transfer rate depending on an increase in channel transmission capacity may theoretically increase to a value acquired by multiplying a maximum transfer rate (Ro) in the case using one antenna by a rate increase rate (Ri) given below.

$$R_i = \min(N_T, N_R) \quad \text{[Equation 1]}$$

That is, for example, in an MIMO communication system using four transmitting antennas and four receiving antennas, a transfer rate which is four times higher than a single antenna system may be acquired.

Such an MIMO antenna technology may be divided into a spatial diversity scheme increasing transmission reliability by using symbols passing through various channel paths and a spatial multiplexing scheme improving the transfer rate by simultaneously transmitting multiple data symbols by using multiple transmitting antennas. Further, a research into a scheme that intends to appropriately acquire respective advantages by appropriately combining two schemes is also a field which has been researched in recent years.

The respective schemes will be described below in more detail.

First, the spatial diversity scheme includes a space-time block coding series and a space-time Trelis coding series scheme simultaneously using a diversity gain and a coding gain. In general, the Trelis is excellent in bit error rate enhancement performance and code generation degree of freedom, but the space-time block code is simple in operational complexity. In the case of such a spatial diversity gain, an amount corresponding to a multiple (NT×NR) of the number (NT) of transmitting antennas and the number (NR) of receiving antennas may be acquired.

Second, the spatial multiplexing technique is a method that transmits different data arrays in the respective transmitting antennas and in this case, mutual interference occurs among data simultaneously transmitted from the transmitter in the receiver. The receiver receives the data after removing the interference by using an appropriate signal processing technique. A noise removing scheme used herein includes a maximum likelihood detection (MLD) receiver, a zero-forcing (ZF) receiver, a minimum mean square error (MMSE) receiver, a diagonal-bell laboratories layered space-time (D-BLAST), a vertical-bell laboratories layered space-time), and the like and in particular, when channel information may be known in the transmitter side, a singular value decomposition (SVD) scheme, and the like may be used.

Third, a technique combining the space diversity and the spatial multiplexing may be provided. When only the spatial diversity gain is acquired, the performance enhancement gain depending on an increase in diversity degree is gradually saturated and when only the spatial multiplexing gain is acquired, the transmission reliability deteriorates in the radio channel. Schemes that acquire both two gains while solving the problem have been researched and the schemes include a space-time block code (Double-STTD), a space-time BICM (STBICM), and the like.

In order to describe a communication method in the MIMO antenna system described above by a more detailed method, when the communication method is mathematically modeled, the mathematical modeling may be shown as below.

First, it is assumed that NT transmitting antennas and NR receiving antennas are present as illustrated in FIG. 5.

First, in respect to a transmission signal, when NT transmitting antennas are provided, since the maximum number of transmittable information is NT, NT may be expressed as a vector given below.

$$s = [s_1, s_2, \ldots, s_{N_T}]^T \quad \text{[Equation 2]}$$

Meanwhile, transmission power may be different in the respective transmission information s1, s2, . . . , sNT and in this case, when the respective transmission power is P1, P2, . . . , PNT, the transmission information of which the transmission power is adjusted may be expressed as a vector given below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Further, ŝ may be expressed as described below as a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} \overset{23}{=} Ps \quad \text{[Equation 4]}$$

Meanwhile, the information vectors ŝ of which the transmission power is adjusted is multiplied by a weight matrix W to constitute NT transmission signals x1, x2, . . . , xNT which are actually transmitted. Herein, the weight matrix serves to appropriately distribute the transmission information to the respective antennas according to a transmission channel situation, and the like. The transmission signals x1, x2, . . . , xNT may be expressed as below by using a vector x.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} =$$ [Equation 5]

$$W\hat{s} = WPs$$

Herein, wij represents a weight between the i-th transmitting antenna and j-th transmission information and W represents the weight as the matrix. The matrix W is called a weight matrix or a precoding matrix.

Meanwhile, the transmission signal x described above may be divided into transmission signals in a case using the spatial diversity and a case using the spatial multiplexing.

In the case using the spatial multiplexing, since different signals are multiplexed and sent, all elements of an information vector s have different values, while when the spatial diversity is used, since the same signal is sent through multiple channel paths, all of the elements of the information vector s have the same value.

Of course, a method mixing the spatial multiplexing and the spatial diversity may also be considered. That is, for example, a case may also be considered, which transmits the same signal by using the spatial diversity through three transmitting antennas and different signals are sent by the spatial multiplexing through residual transmitting antennas.

Next, when NR receiving antennas are provided, received signals y1, y2, . . . , yNR of the respective antennas are expressed as a vector y as described below.

$$y = [y_1, y_2, \ldots, y_{N_R}]^T$$ [Equation 6]

Meanwhile, in the case of modeling the channel in the MIMO antenna communication system, respective channels may be distinguished according to transmitting and receiving antenna indexes and a channel passing through a receiving antenna i from a transmitting antenna j will be represented as hij. Herein, it is noted that in the case of the order of the index of hij, the receiving antenna index is earlier and the transmitting antenna index is later.

The multiple channels are gathered into one to be expressed even as vector and matrix forms. An example of expression of the vector will be described below.

FIG. 6 is a diagram illustrating a channel from multiple transmitting antennas to one receiving antenna.

As illustrated in FIG. 6, a channel which reaches receiving antenna I from a total of NT transmitting antennas may be expressed as below.

$$h_i^T = [h_{i1}, h_{i2}, \ldots, h_{iN_T}]$$ [Equation 7]

Further, all of channels passing through NR receiving antennas from NT transmitting antennas may be shown as below through matrix expression shown in Equation given above.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix}$$ [Equation 8]

Meanwhile, since additive white Gaussian noise (AWGN) is added after passing through a channel matrix H given above in an actual channel, white noises n1, n2, . . . , nNR added to NR receiving antennas, respectively are expressed as below.

$$n = [n_1, n_2, \ldots, n_{N_R}]^T$$ [Equation 9]

Each of the transmission signal, the reception signal, the channel, and the white noise in the MIMO antenna communication system may be expressed through a relationship given below by modeling the transmission signal, the reception signal, the channel, and the white noise.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$ [Equation 10]

$$Hx + n$$

The numbers of rows and columns of the channel matrix H representing the state of the channel are determined by the numbers of transmitting and receiving antennas. In the case of the channel matrix H, the number of rows becomes equivalent to NR which is the number of receiving antennas and the number of columns becomes equivalent to NR which is the number of transmitting antennas. That is, the channel matrix H becomes an NR×NR matrix.

In general, a rank of the matrix is defined as the minimum number among the numbers of independent rows or columns. Therefore, the rank of the matrix may not be larger than the number of rows or columns. As an equation type example, the rank (rank(H)) of the channel matrix H is limited as below.

$$\text{rank}(H) \leq \min(N_T, N_R)$$ [Equation 11]

Further, when the matrix is subjected to Eigen value decomposition, the rank may be defined as not 0 but the number of Eigen values among the Eigen values. By a similar method, when the rank is subjected to singular value decomposition, the rank may be defined as not 0 but the number of singular values. Accordingly, a physical meaning of the rank in the channel matrix may be the maximum number which may send different information in a given channel.

In the present specification, a 'rank' for MIMO transmission represents the number of paths to independently transmit the signal at a specific time and in a specific frequency resource and 'the number of layers' represents the number of signal streams transmitted through each path. In general, since the transmitter side transmits layers of the number corresponding to the number of ranks used for transmitting the signal, the rank has the same meaning as the number layers if not particularly mentioned.

Coordinated Multi-Point Transmission and Reception (COMP)

According to a demand of LTE-advanced, CoMP transmission is proposed in order to improve the performance of the system.

The CoMP is also called co-MIMO, collaborative MIMO, network MIMO, and the like. It is anticipated that the CoMP will improves the performance of the terminal positioned at a cell edge and improve an average throughput of the cell (sector).

In the present disclosure, an eNB, an access point, and a cell have the same meaning.

In general, inter-cell interference decreases the performance and the average cell (sector) efficiency of the terminal positioned at the cell edge in a multi-cell environment in which a frequency reuse index is 1. In order to alleviate the inter-cell interference, the LTE system adopts a simple passive method such as fractional frequency reuse (FFR) in the LTE system so that the terminal positioned at the cell edge has appropriate performance efficiency in an interference-limited environment. However, a method that reuses the inter-cell interference or alleviates the inter-cell interference as a signal (desired signal) which the terminal needs to receive is more preferable instead of reduction of the use of the frequency resource for each cell. The CoMP transmission scheme may be adopted in order to achieve the aforementioned object.

The CoMP scheme which may be applied to the downlink may be classified into a joint processing (JP) scheme and a coordinated scheduling/beamforming (CS/CB) scheme.

In the case of the JP scheme, data from each eNB that performs CoMP to a UE is instantaneously simultaneously transmitted to the UE, and the UE improves reception performance by combining signals from each eNB. On the other hand, in the case of CS/CB, data to one UE is instantaneously transmitted through one eNB, and scheduling or beamforming is performed such that interference of the UE with respect to other eNBs is minimized.

In the JP scheme, the data may be used at each point (base station) in a CoMP wise. The CoMP wise means a set of base stations used in the CoMP scheme. The JP scheme may be again classified into a joint transmission scheme and a dynamic cell selection scheme.

The joint transmission scheme means a scheme in which the signal is simultaneously transmitted through a plurality of points which are all or fractional points in the CoMP wise. That is, data transmitted to a single terminal may be simultaneously transmitted from a plurality of transmission points. Through the joint transmission scheme, the quality of the signal transmitted to the terminal may be improved regardless of coherently or non-coherently and interference with another terminal may be actively removed.

The dynamic cell selection scheme means a scheme in which the signal is transmitted from the single point through the PDSCH in the CoMP wise. That is, data transmitted to the single terminal at a specific time is transmitted from the single point and data is not transmitted to the terminal at another point in the CoMP wise. The point that transmits the data to the terminal may be dynamically selected.

According to the CS/CB scheme, the CoMP wise performs beamforming through coordination for transmitting the data to the single terminal. That is, the data is transmitted to the terminal only in the serving cell, but user scheduling/beamforming may be determined through coordination of a plurality of cells in the CoMP wise.

In the case of the uplink, CoMP reception means receiving the signal transmitted by the coordination among a plurality of points which are geographically separated. The CoMP scheme which may be applied to the uplink may be classified into a joint reception (JR) scheme and the coordinated scheduling/beamforming (CS/CB) scheme.

The JR scheme means a scheme in which the plurality of points which are all or fractional points receives the signal transmitted through the PDSCH in the CoMP wise. In the CS/CB scheme, only the single point receives the signal transmitted through the PDSCH, but the user scheduling/beamforming may be determined through the coordination of the plurality of cells in the CoMP wise.

Hybrid-Automatic Repeat and Request (HARQ)

The LTE physical layer supports the HARQ in the PDSCH and the PUSCH, and transmits the related acknowledgement (ACK) feedback in a separate control channel.

In the LTE FDD system, eight Stop-And-Wait (SAW) HARQ processes are supported on both the uplink and the downlink in accordance with a constant round-trip time (RTT) of 8 ms.

FIG. 7 is a diagram illustrating a downlink HARQ process in an LTE FDD system, and FIG. 8 is a diagram illustrating an uplink HARQ process in an LTE FDD system.

The respective HARQ processes are defined by a unique HARQ process identifier of 3-bit size, and individual soft buffer allocation for combination of retransmitted data is required for a reception end (that is, UE at the downlink HARQ process, and eNodeB at the uplink HARQ process).

In addition, it is defined that information such as a new data indicator (NDI), a redundancy version (RV) and a modulation and coding scheme (MCS) fields in the downlink control information for the HARQ processes. The NDI field is toggled whenever a new packet transmission is started. The RV field indicates the RV that is selected for a transmission and a retransmission. The MCS field indicates a modulation and coding method level.

The downlink HARQ process of the LTE system is an adaptive asynchronous scheme. Accordingly, the downlink control information for the HARQ process is explicitly accompanied per downlink transmission.

On the other hand, the uplink HARQ process of the LTE system is a synchronous scheme, and may be performed adaptively or non-adaptively. Since the uplink non-adaptive HARQ scheme does not accompany signaling of the explicit control information, the sequence such as previously set RV sequence (i.e., 0, 2, 3, 1, 0, 2, 3, 1, . . . ) is required for a continuous packet transmission. However, according to the uplink adaptive HARQ scheme, the RV is signaled explicitly. In order to minimize the control signaling, the uplink mode in which the RV (or the MCS) is combined with other control information is also supported.

Limited Buffer Rate Matching (LBRM)

Owing to the entire memory required for saving the Log-Likelihood Ratio (LLR) in order to support the HARQ process (throughout all HARQ processes), that is, the UE HARQ soft buffer size, the complexity in the UE implement is increased.

The object of the Limited Buffer Rate Matching (LBRM) is to maintain the peak data rates and to minimize the influence on the system performance, and in addition, to decrease the UE HARQ soft buffer size. The LBRM reduces the length of virtual circular buffer of the code block segments for the transmission block (TB) that has a size greater than a predetermined size. Using the LBRM, the mother code rate for the TB becomes the function of UE soft buffer size that is allocated to the TB size and the TB. For example, for the UE category that does not support the FDD operation and the UE of the lowest category (e.g., UE categories 1 and 2 that do not support the spatial multiplexing), the limit on the buffer is transparent. That is, the LBRM does not cause the reduction of the soft buffer. In the case of the UE of high category (i.e., UE categories 3, 4 and 5), the size of soft buffer is calculated by assuming the buffer decrease of 50% that corresponds to two thirds of the mother code rate for eight HARQ processes and the maximum TB. Since an eNB knows the soft buffer capacity of a UE, the code bit is transmitted in the virtual circular buffer (VCB) that may be stored in the HARQ soft buffer of the UE for all of the given TB (re)transmissions.

Reference Signal (RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using a distortion degree when the signal is transmitted through the channel are primarily used. The aforementioned signal is referred to as a pilot signal or a reference signal (RS).

Recently, when packets are transmitted in most of mobile communication systems, multiple transmitting antennas and multiple receiving antennas are adopted to increase transmission and reception efficiency compared to a single transmitting antenna and single receiving antenna. When the data is transmitted and received by using the MIMO antenna, a channel state between the transmitting antenna and the receiving antenna need to be detected in order to accurately receive the signal. Therefore, the respective transmitting antennas need to have individual reference signals.

Reference signal in a wireless communication system can be mainly categorized into two types. In particular, there are a reference signal for the purpose of channel information acquisition and a reference signal used for data demodulation. Since the object of the former reference signal is to enable a UE (user equipment) to acquire a channel information in DL (downlink), the former reference signal should be transmitted on broadband. And, even if the UE does not receive DL data in a specific subframe, it should perform a channel measurement by receiving the corresponding reference signal. Moreover, the corresponding reference signal can be used for a measurement for mobility management of a handover or the like. The latter reference signal is the reference signal transmitted together when a base station transmits DL data. If a UE receives the corresponding reference signal, the UE can perform channel estimation, thereby demodulating data. And, the corresponding reference signal should be transmitted in a data transmitted region.

The DL reference signals are categorized into a common reference signal (CRS) shared by all terminals for an acquisition of information on a channel state and a measurement associated with a handover or the like and a dedicated reference signal (DRS) used for a data demodulation for a specific terminal. Information for demodulation and channel measurement may be provided by using the reference signals. That is, the DRS is used only for data demodulation only, while the CRS is used for two kinds of purposes including channel information acquisition and data demodulation.

The receiver side (that is, terminal) measures the channel state from the CRS and feeds back the indicators associated with the channel quality, such as the channel quality indicator (CQI), the precoding matrix index (PMI), and/or the rank indicator (RI) to the transmitting side (that is, base station). The CRS is also referred to as a cell-specific RS. On the contrary, a reference signal associated with a feed-back of channel state information (CSI) may be defined as CSI-RS.

The DRS may be transmitted through resource elements when data demodulation on the PDSCH is required. The terminal may receive whether the DRS is present through the upper layer and is valid only when the corresponding PDSCH is mapped. The DRS may be referred to as the UE-specific RS or the demodulation RS (DMRS).

FIG. 9 illustrates a reference signal pattern mapped to a downlink resource block pair in the wireless communication system to which the present disclosure can be applied.

Referring to FIG. 9, as a unit in which the reference signal is mapped, the downlink resource block pair may be expressed by one subframe in the time domain×12 subcarriers in the frequency domain. That is, one resource block pair has a length of 14 OFDM symbols in the case of a normal cyclic prefix (CP) (FIG. 9a) and a length of 12 OFDM symbols in the case of an extended cyclic prefix (CP) (FIG. 9b). Resource elements (REs) represented as '0', '1', '2', and '3' in a resource block lattice mean the positions of the CRSs of antenna port indexes '0', '1', '2', and '3', respectively and resource elements represented as 'D' means the position of the DRS.

Hereinafter, when the CRS is described in more detail, the CRS is used to estimate a channel of a physical antenna and distributed in a whole frequency band as the reference signal which may be commonly received by all terminals positioned in the cell. That is, the CRS is transmitted in each subframe across a broadband as a cell-specific signal. Further, the CRS may be used for the channel quality information (CSI) and data demodulation.

The CRS is defined as various formats according to an antenna array at the transmitter side (base station). The RSs are transmitted based on maximum 4 antenna ports depending on the number of transmitting antennas of a base station in the 3GPP LTE system (for example, release-8). The transmitter side has three types of antenna arrays of three single transmitting antennas, two transmitting antennas, and four transmitting antennas. For instance, in case that the number of the transmitting antennas of the base station is 2, CRSs for antenna #1 and antenna #2 are transmitted. For another instance, in case that the number of the transmitting antennas of the base station is 4, CRSs for antennas #1 to #4 are transmitted.

When the base station uses the single transmitting antenna, a reference signal for a single antenna port is arrayed.

When the base station uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the base station uses four transmitting antennas, reference signals for four transmitting antenna ports are arrayed by using the TDM and/or FDM scheme. Channel information measured by a downlink signal receiving side (terminal) may be used to demodulate data transmitted by using a transmission scheme such as single transmitting antenna transmission, transmission diversity, closed-loop spatial multiplexing, open-loop spatial multiplexing, or multi-user MIMO.

If the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

A rule for mapping the CRS to the resource block is defined as below.

$$k = 6m + (v + v_{shift}) \bmod 6 \quad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 12, k and l represent the subcarrier index and the symbol index, respectively and p represents the antenna port. $N_{symb}^{DL}$ represents the number of OFDM symbols in one downlink slot and $N_{RB}^{DL}$ represents the number of radio resources allocated to the downlink. ns represents a slot index and, $N_{ID}^{cell}$ represents a cell ID. mod represents a modulo operation. The position of the reference signal varies depending on the $v_{shift}$ value in the frequency domain. Since $v_{shift}$ depends on the cell ID, the position of the reference signal has various frequency shift values according to the cell.

More specifically, the position of the CRS may be shifted in the frequency domain according to the cell in order to improve channel estimation performance through the CRS. For example, when the reference signal is positioned at an interval of three subcarriers, reference signals in one cell are allocated to a 3k-th subcarrier and a reference signal in another cell is allocated to a 3k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DRS is described in more detail, the DRS is used for demodulating data. A precoding weight used for a specific terminal in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DRS for rank 1 beamforming is defined. The DRS for the rank 1 beamforming also means a reference signal for antenna port index 5.

A rule of mapping the DRS to the resource block is defined as below. Equation 13 shows the case of the normal CP and Equation 14 shows the case of the extended CP.

$$k = (k') \bmod N_{sc}^{RB} + N_{sc}^{RB} \cdot n_{PRB} \quad \text{[Equation 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 13 and 14, k and l represent the subcarrier index and the symbol index, respectively and p represents the antenna port. $N_{sc}^{RB}$ represents the size of the resource block in the frequency domain and is expressed as the number of subcarriers. $n_{PRB}$ represents the number of physical resource blocks. $N_{RB}^{PDSCH}$ represents a frequency band of the resource block for the PDSCH transmission. ns represents the slot index and $N_{ID}^{cell}$ represents the cell ID. mod represents the modulo operation. The position of the reference signal varies depending on the $v_{shift}$ value in the frequency domain. Since $v_{shift}$ depends on the cell ID, the position of the reference signal has various frequency shift values according to the cell.

The LTE-A system which is an evolved version of the LTE system should support maximum eight transmitting antennas for downlink transmission. Accordingly, reference signals for maximum eight transmitting antennas should also be supported. In the LTE system, since the downlink reference signals are defined for maximum four antenna ports, if the base station includes four or more downlink transmitting antennas and maximum eight downlink transmitting antennas in the LTE-A system, the reference signals for these antenna ports should be defined additionally. The reference signals for maximum eight transmitting antenna ports should be designed for two types of reference signals, i.e., the reference signal for channel measurement and the reference signal for data demodulation.

One of important considerations in designing the LTE-A system is the backward compatibility. That is, the backward compatibility means that the LTE user equipment should be operated normally even in the LTE-A system without any problem and the LTE-A system should also support such normal operation. In view of reference signal transmission, the reference signals for maximum eight transmitting antenna ports should be defined additionally in the time-frequency domain to which CRS defined in the LTE is transmitted on full band of each subframe. However, in the LTE-A system, if reference signal patterns for maximum eight transmitting antennas are added to full band per subframe in the same manner as the CRS of the existing LTE system, the RS overhead becomes too great.

Accordingly, the reference signal designed newly in the LTE-A system may be divided into two types. Examples of the two types of reference signals include a channel state information-reference signal (CSI-RS) (or may be referred to as channel state indication-RS) for channel measurement for selection of modulation and coding scheme (MCS) and a precoding matrix index (PMI), and a data demodulation-reference signal (DM-RS) for demodulation of data transmitted to eight transmitting antennas.

The CSI-RS for the channel measurement purpose is designed for channel measurement mainly unlike the existing CRS used for channel measurement, handover measurement, and data demodulation. The CSI-RS may also be used for handover measurement. Since the CSI-RS is transmitted only to obtain channel state information, it may not be transmitted per subframe unlike the CRS of the existing LTE system. Accordingly, in order to reduce overhead, the CSI-RS may intermittently be transmitted on the time axis.

The DM-RS is dedicatedly transmitted to the UE which is scheduled in the corresponding time-frequency domain for data demodulation. In other words, the DM-RS of a specific UE is only transmitted to the region where the corresponding user equipment is scheduled, i.e., the time-frequency domain that receives data.

In the LTE-A system, an eNB should transmit the CSI-RSs for all the antenna ports. Since the transmission of CSI-RSs for up to eight transmission antenna ports in every subframe leads to too much overhead, the CSI-RSs should be transmitted intermittently along the time axis, thereby reducing CSI-RS overhead. Therefore, the CSI-RSs may be transmitted periodically at every integer multiple of one subframe, or in a predetermined transmission pattern. The CSI-RS transmission period or pattern of the CSI-RSs may be configured by the eNB.

In order to measure the CSI-RSs, a UE should have knowledge of the information for each of the CSI-RS antenna ports in the cell to which the UE belong such as the transmission subframe index, the time-frequency position of the CSI-RS resource element (RE) in the transmission subframe, the CSI-RS sequence, and the like.

In the LTE-A system, an eNB should transmit each of the CSI-RSs for maximum eight antenna ports, respectively. The resources used for transmitting the CSI-RS of different antenna ports should be orthogonal. When the eNB transmits the CSI-RS for different antenna ports, by mapping the CSI-RS for each of the antenna ports to different REs, the resources may be orthogonally allocated in the FDM/TDM scheme. Otherwise, the CSI-RSs for different antenna ports may be transmitted in the CDM scheme with being mapped to the mutually orthogonal codes.

When the eNB notifies the information of the CSI-RS to the UE in its own cell, the information of the time-frequency in which the CSI-RS for each antenna port is mapped should be notified. Particularly, the information includes the subframe numbers on which the CSI-RS is transmitted, the period of the CSI-RS being transmitted, the subframe offset in which the CSI-RS is transmitted, the OFDM symbol number in which the CSI-RS RE of a specific antenna is transmitted, the frequency spacing, the offset or shift value of RE on the frequency axis.

FIG. 10 illustrates a periodic transmission scheme of CSI-RS in a wireless communication system to which the present disclosure may be applied.

As shown in FIG. 10, for an eNB that transmits the CSI-RS, the transmission period of the corresponding eNB is 10 (ms or subframes), and the transmission offset of the CSI-RS is 3 (subframes). The eNB has different offset values such that the CSI-RS of several cells should be evenly distributed on the time. The eNB in which the CSI-RS is transmitted in the period of 10 ms has ten offset values of 0 to 9. The offset values represent the value of subframes on which the eNB that has a specific period actually starts the CSI-RS transmission. When the eNB notifies the period and the offset value of the CSI-RS to a UE, the UE measures the CSI-RS of the eNB on the corresponding position using the value and reports the information such as CQI/PMI/RI, etc. to the eNB. The all types of the information related to the CSI-RS are cell-specific information.

FIG. 11 illustrates an aperiodic transmission scheme of CSI-RS in a wireless communication system to which the present disclosure may be applied.

FIG. 11 exemplifies the scheme that the CSI-RS is transmitted with a transmission subframe pattern. The CSI-RS transmission pattern includes 10 subframes, and whether to transmit the CSI-RS is designated by 1-bit indicator in each subframe.

In general, the following two schemes are considered as the scheme that an eNB notifies the CSI-RS configuration to a UE.

First, a first scheme of using the Dynamic BCH (DBCH) signaling may be considered.

The first scheme is the scheme that an eNB broadcasts the information of the CSI-RS configuration to UEs. In the LTE system, when an eNB notifies the contents for the system information to UEs, the corresponding information is transmitted to the Broadcasting Channel (BCH), normally. However, in the case that there are too much contents and it is unable to transmit all of the contents to the BCH, the contents are transmitted in the same way of transmitting normal data, but the PDCCH of the corresponding data is transmitted by masking CRC using the System information RNTI (SI-RNTI), not a specific UE ID (e.g., C-RNTI). And, the actual system information is transmitted to the PDSCH region like the normal unicast data. Then, all of the UE in a cell decodes the PDCCH using the SI-RNTI, and acquires the system information by decoding the PDSCH indicated by the PDCCH. Such a broadcast scheme is also called the Dynamic BCH (DBCH), distinguished from the Physical BCH (PBCH) scheme that is normal broadcast scheme.

The system information broadcasted in the LTE system is basically divided into two types: a Master Information Block (MIB) transmitted to the PBCH and a System Information Block (SIB) transmitted to the PDSCH with being multiplexed with the normal unicast data. In the LTE system, since the information transmitted in SIB type 1 to SIB type 8 (SIB 1~SIB 8) is already defined, the CSI-RS configuration is transmitted in SIB 9, SIB 10, and so on, that are newly introduced in the LTE-A system.

Next, a second scheme using the RRC signaling may be considered.

The second scheme is the scheme that an eNB notifies the CSI-RS configuration to each of UEs using the dedicated RRC signaling. During the process that a UE establishes a connection to the eNB through an initial access or the handover, the eNB notifies the CSI-RS configuration to the corresponding UE through the RRC signaling. Otherwise, the eNB notifies the CSI-RS configuration through an RRC signaling message that requires a channel state feedback based on the CSI-RS measurement to the UE.

The contents reviewed with reference to FIGS. 1 to 11 may be applied to clarify or materialize embodiments to be described later in the present disclosure.

Due to a rapid increase in the speed of mobile data traffic, an advanced form of a communication method compared to a current mobile communication system is required. There emerges a need for a transceiver device having various forms for Internet of things and device-to-device communication.

A massive multiple-input multiple-output (MIMO) transmission/reception method used in the 5G New Radio (NR) standard is a core technology capable of significantly increasing the data speed through efficient utilization of wireless resources. Such a technology can improve its efficiency by being combined with a new form of an antenna structure.

Specifically, if a three-dimensional antenna array structure different from the existing one-dimensional uniform linear array (ULA) and two-dimensional uniform rectangular array (URA) is used, omnidirectional transmission and reception are possible. That is, smooth communication with various IoT communication devices including small aerial vehicles and vehicles is made possible.

In particular, in a 5G communication system, multiple antennas are crowded and disposed as a millimeter wave band is used. In this aspect, in the structure of an antenna array, implementation easiness in addition to beamforming performance also needs to be considered. A three-dimensional array may be configured by repeatedly disposing the ULA and the URA in several forms. However, in view of the characteristics of a polyhedron present in a three-dimensional space, when a single face is a triangle, the three-dimensional array can be easily configured. The three-dimensional array can be configured in various forms compared to a case where a single face is a triangle.

Accordingly, the present disclosure proposes a uniform triangular array (UTA) structure, and presents various three-dimensional shapes which may be obtained by repeatedly using such an array. The various three-dimensional shapes may be used when an antenna structure is designed. Furthermore, the present disclosure presents a beamforming vector equation specified for an array structure and a basic codebook for a uniform triangular array in order to implement efficient omnidirectional transmission for 3D beamforming.

Methods described hereinafter are merely classified for convenience of description, and some elements of any one method may be substituted with some elements of another method or they may be mutually combined and applied.

Hereinafter, contents related to contents to be described are summarized as follows.

First, a uniform triangular array and a three-dimensional antenna structure having the uniform triangular array and utilization thereof are described. When one uniform triangular array is named a panel, a method of configuring a three-dimensional antenna structure using multiple panels is proposed. Specifically, a ceiling or wall type, a polyhedron type, and a cylinder type are presented.

Second, a method using an antenna structure is described. There is proposed a codebook configuration scheme for analyzing an antenna gain characteristic of a single panel and exchanging channel information In order to perform data transmission in a target direction.

Third, there is proposed a beamforming vector equation in an antenna structure composed of a plurality of panels. In order to determine the number of collaborating panels for using a three-dimensional antenna, transmission performance is evaluated upon collaborative utilization of multiple panels.

Fourth, an array utilization scheme for performing simultaneous data transmission for multiple users present at various locations in a space is presented, and a reference signaling method necessary for a cellular environment is defined.

Hereinafter, a structure of a uniform triangular array is specifically described.

FIG. 12 illustrates the architecture of a uniform triangular array according to an embodiment of the present disclosure.

A shape of a panel includes a uniform triangular array, and a regular triangle is a basic structure. Individual antenna elements are disposed at locations indicated by dots in the drawing. An interval between adjacent antennas is $\varepsilon$. The antennas are disposed in a total of L rows. l antenna elements (l=1, . . . , L) are present in an l-th row from the top of the triangle panel. Accordingly, a total number of antenna elements constituting the panel is N=L(L+1)/2. FIG. 12 illustrates a case where L=5 and N=15. The longest interval $\zeta$ determines a distance from an antenna element present in an adjacent panel, and may be adjusted, if necessary.

Hereinafter, a beam pattern according to a uniform triangular array is described.

FIGS. 13 and 14 are diagrams for comparing a beam pattern according to a uniform triangular array according to an embodiment of the present disclosure and a beam pattern having a uniform rectangular array.

FIG. 13 illustrates a beam shape (b) and beam patterns (c) and (d) of a single panel (a) composed of a uniform triangular array (UTA). FIG. 14 illustrates a beam shape (b)

and beam patterns (c) and (d) of a uniform rectangular array (a) using antenna elements having a number similar to that of a uniform triangular array.

Referring to (a) of FIG. 13, the number of antenna elements included in the uniform triangular array is N=15. Referring to (a) of FIG. 14, the number of antenna elements included in the uniform rectangular array is N=16.

The beam patterns according to (c) of FIG. 13, (d) of FIG. 13, (c) of FIG. 14 and (d) of FIG. 14 illustrate that received power is evaluated in a range of an azimuth angle $\alpha \in [-\pi, +\pi]$ based on the front direction of each panel and a maximum power value monitored in the front direction is normalized as 0 dB.

If an inclined degree of a zenith angle is indicated as a parameter $\beta$, in the uniform triangular array, a similar beam shape in which the $\beta$ value has a cycle of 60 degrees is repeated ((c) of FIG. 13 and (d) of FIG. 13).

In the uniform rectangular array (URA), a similar beam shape in which the $\beta$ value has a cycle of 90 degrees is repeated ((c) of FIG. 14 and (d) of FIG. 14). A change in the width of a main beam in which a signal is transmitted according to a change in the parameter $\beta$ is monitored, but a difference between beam shapes of the uniform triangular array and the uniform rectangular array is not generally great. Accordingly, the uniform triangular array may substitute the existing uniform rectangular array.

Hereinafter, a three-dimensional antenna composed of the uniform triangular array and a beamforming vector related to the location of a UE are specifically described with reference to FIGS. 15 and 16.

FIG. 15 is a diagram illustrating a three-dimensional antenna composed of a panel having a uniform triangular array according to an embodiment of the present disclosure and the location of a UE based on a polar coordinate system.

Referring to FIG. 15, O indicates the original point, that is, a reference. U indicates the location of a UE, and $A_{m,n}$ indicates the location of an n-th antenna element of an m-th panel. The azimuth angle of a polar coordinate according to the location of the UE is defined as $\Phi$, ☐ and the zenith angle thereof is defined as $\Theta$.

When a distance from the original point to the UE is defined as $\rho$, orthogonal coordinates of the UE are determined as $U=[\rho \cos \Phi \sin \Theta, \rho \sin \Phi \sin \Theta, \rho \cos \Theta]$.

Furthermore, when the azimuth angle of polar coordinates of an antenna element is defined as $\phi_{m,n}$, the zenith angle thereof is defined as ☐$\theta_{m,n}$, and the distance from the original point is indicated as $r_{m,n}$, the orthogonal coordinate value is determined as $A_{m,n}=[r_{m,n} \cos \phi_{m,n} \sin \theta_{m,n}, r_{m,n} \sin \phi_{m,n} \sin \theta_{m,n}, r_{m,n} \cos \theta_{m,n}]$.

In order to indicate the distance between the antenna and the UE, a point at which $A_{m,n}$ is orthogonally projected on a plane in which U is present in the direction of a vector $\overrightarrow{OU}$ is defined as $A'_{m,n}$. When the distance between the antenna element $A_{m,n}$ and the plane is subtracted from the distance between the original point and the plane, a distance difference may be represented like Equation 15.

$$d_{m,n}=|\overrightarrow{A_{m,n}A'_{m,n}}|-|\overrightarrow{OU}|=-R(\sin \Theta \sin \theta_{m,n} \cos(\Phi-\phi_{m,n})+\cos \Theta \cos \theta_{m,n}) \quad \text{[Equation 15]}$$

In Equation 15, $d_{m,n}$ indicates a relative distance of each antenna element from the UE with respect to the original point. A channel phase difference for each antenna element may be calculated using the relative distance. When a complex channel of the antenna element $A_{m,n}$ is indicated as $u_{m,n}$, a corresponding phase value is determined like Equation 16.

$$\angle u_{m,n}=2\pi f_c d_{m,n}/\lambda=-2\pi f_c R(\sin \Theta \sin \theta_{m,n} \cos(\Phi-\phi_{m,n})+\cos \Theta \cos \theta_{m,n})/\lambda \quad \text{[Equation 16]}$$

In this case, $f_c$ means a carrier frequency, and $\lambda$ means a wavelength. When a complex channel of N antenna elements $A_{m,1}, A_{m,2}, \ldots, A_{m,N}$ present in an m-th panel is indicated as a vector $u_m=[u_{m,1} \ u_{m,2} \ldots u_{m,N}]^T$, a corresponding phase value may be indicated like Equation 17.

$$\angle u_m = \quad \text{[Equation 17]}$$

$$[\angle u_{m,1} \ \angle u_{m,2} \ldots \angle u_{m,N}]^T = (2\pi f_c/\lambda)[d_{m,1} \ d_{m,2} \ldots d_{m,N}]^T$$

Assuming that a three-dimensional antenna array is composed of a total of M UTA panels, a vector indicating a phase difference of all antenna elements present in the array may be indicated like Equation 18.

$$\angle u=[\Phi u1 \angle u2 \ldots \angle uM]^T \quad \text{[Equation 18]}$$

A beamforming vector for transmitting a signal in the direction of the UE needs to be set to compensate for the phase value indicated in Equation 18. A beamforming vector applied to the antenna array using M panels may be determined like Equation 19.

$$v=\exp(-j\angle u)=[e^{-j\angle u1}e^{-j\angle u2} \ldots e^{-j\angle uM}]^T \quad \text{[Equation 19]}$$

A channel phase difference may be calculated using each antenna element and information on the zenith angle and azimuth angle of a UE. A beamforming vector may be generated based on the channel phase difference. In Equation 19, if the vector is set as the multiplier of an exponential function, the vector means a vector composed of elements obtained by setting each of the elements of the vector as the multiplier of an exponential function. That is, when the vector $z=[x \ y]^T$, $e^z=[e^x e^y]^T$.

The beamforming vector has a form composed of beams transmitted in respective panels. Each panel needs to form a beam by setting an angle in the direction of a user. For efficient beamforming, one of a limited number of predetermined beamforming vectors may be selected and transmitted. Hereinafter, a codebook configuration scheme for a uniform triangular array is described. Beamforming vectors indicating a horizontal beam component and a vertical beam component compared to the front direction of the uniform triangular array, that is, an antenna reference direction (boresight), are determined. The beamforming vectors are combined and used to perform beamforming. First, a basic beamforming vector for generating a vertical beam using antenna elements located in each column of the uniform triangular array is defined.

FIG. 16 is a diagram for describing a code vector configuration for a uniform triangular array according to an embodiment of the present disclosure.

Referring to FIG. 16, the uniform triangular array may be considered as being composed of a partial set of elements present within a rectangle composed of L rows and 2L−1 columns. A vertical beamforming vector, that is, a length L configured using the first row of the L rows as a reference point, may be indicated in the form of a discrete Fourier transform (DFT) vector, that is, a form in which a phase value is sequentially increased as in Equation 20.

$$a_p = [1 \ e^{j2\pi p/P} \ e^{j2\pi 2p/P} \ \ldots \ e^{j2\pi(L-1)p/P}]^T, \quad \text{[Equation 20]}$$

$$p = 0, 1, \ldots, P-1$$

In this case, a vertical beam is formed of one of a total of P angles based on the index p of a vertical beamforming vector. When these vectors are indicated as one matrix, an L×P DFT matrix $A=[a_0 \ a_1 \ \ldots \ a_{P-1}]$ is obtained. Furthermore, a horizontal beamforming vector, that is, a length 2L−1 composed using, as a reference point located at the center among 2L−1 columns, may be indicated in a modified form of a DFT vector as in Equation 21.

$$b_q = [e^{-j2\pi(L-1)q/Q} \ \ldots \ e^{-j2\pi q/Q} \ 1 \ e^{j2\pi q/Q} \ \ldots \ e^{j2\pi(L-1)q/Q}]^T, \quad \text{[Equation 21]}$$

$$q = 0, 1, \ldots, Q-1$$

A horizontal beam is generated as one of a total of Q angles based on the index q of the horizontal beamforming vector. When Q code vectors are indicated as one matrix, a $B=[b_0 \ b_1 \ \ldots \ b_{Q-1}]$, that is, an (2L−1)×Q-modified DFT matrix, is obtained. In order to generate a beam in which vertical and horizontal directions are combined, an L×(2L−1) beamforming matrix composed of the product of the column vector $a_p$ and the row vector $b_q^T$ may be indicated like Equation 22.

$$C_{p,q} = a_p b_q^T = \begin{bmatrix} e^{-j2\pi(L-1)q/Q} & e^{-j2\pi q/Q} & 1 & e^{j2\pi q/Q} & e^{j2\pi(L-1)q/Q} \\ e^{j2\pi p/P}e^{-j2\pi(L-1)q/Q} & e^{j2\pi p/P}e^{-j2\pi q/Q} & e^{j2\pi p/P} & e^{j2\pi p/P}e^{j2\pi q/Q} & e^{j2\pi p/P}e^{j2\pi(L-1)q/Q} \\ e^{j2\pi 2p/P}e^{-j2\pi(L-1)q/Q} & e^{j2\pi 2p/P}e^{-j2\pi q/Q} & e^{j2\pi 2p/P} & e^{j2\pi 2p/P}e^{j2\pi q/Q} & \ldots & e^{j2\pi 2p/P}e^{j2\pi(L-1)q/Q} \\ \vdots & \vdots & \vdots & \vdots & \vdots \\ e^{j2\pi(L-1)p/P}e^{-j2\pi(L-1)q/Q} & e^{j2\pi(L-1)p/P}e^{-j2\pi q/Q} & e^{j2\pi(L-1)p/P} & e^{j2\pi(L-1)p/P}e^{j2\pi q/Q} & e^{j2\pi(L-1)p/P}e^{j2\pi(L-1)q/Q} \end{bmatrix} \quad \text{[Equation 22]}$$

The beamforming matrix of Equation 22 includes the adjustment of phase components of all elements within a rectangle indicated in FIG. 16. Accordingly, elements necessary for beamforming for the uniform triangular array among all the elements need to be defined. That is, N elements, that is, the number of antenna elements of the uniform triangular array, among elements within the beamforming matrix $C_{p,q}$ may be selected to define a code vector.

An n-th element $c_{p,q}^n$ of the code vector is a value for adjusting the phase component of an n-th antenna element like n=1, n=2, . . . in FIG. 16. When $c_{p,q}^n$ is selected as an element located at the l-th row and k-th column of the beamforming matrix $C_{p,q}$, a relation $c_{p,q}^n = C_{p,q}^{(l,k)}$ is established. In this case, the index l, k of the beamforming matrix for the uniform triangular array is determined like Equation 23.

$$l = x, \text{ if } \frac{x(x-1)}{2} < n \leq \frac{x(x+1)}{2}, \quad \text{[Equation 23]}$$

$$k = L - l^2 + 2n - 1$$

If a code vector composed of the element $c_{p,q}^n$ determined based on the index l, k satisfying Equation 23 is $c_{p,q}$, the code vector may be indicated like Equation 24.

$$c_{p,q} = [c_{p,q}^1 \ c_{p,q}^2 \ \ldots \ c_{p,q}^N]^T \quad \text{[Equation 24]}$$

When PQ code vectors, that is, the length N, are obtained with respect to all vertical beamforming vector indices p=0, 1, . . . , P−1 and horizontal beamforming indices q=0, 1, . . . , Q−1 and a codebook C composed of these code vectors is configured, this may be indicated like Equation 25.

$$C=[c_{1,1} c_{1,2} \ldots c_{1,Q} c_{2,1} c_{2,2} \ldots c_{2,Q} \ldots c_{P,1} c_{P,2} \ldots c_{P,Q}] \quad \text{[Equation25]}$$

Each column of the N×(PQ) matrix C defined in Equation 25 is a code vector applied to the uniform triangular array.

For example, when L=5, P=8, Q=32, assuming that the length of the vertical beamforming vector $a_p$ is 5 and p=2 is selected, $a_2=[1 \ e^{j2\pi(2/8)} \ e^{j2\pi(4/8)} \ e^{j2\pi(6/8)} \ e^{j2\pi(8/8)}]^T$. Assuming that the length of the horizontal beamforming vector $b_q$ is 9 and q=7 is selected, $b_7=[e^{-j2\pi(28/32)} \ e^{-j2\pi(21/32)} \ e^{-j2\pi(21/32)} \ e^{j2\pi(7/32)} \ 1 \ e^{j2\pi(7/32)} \ e^{j2\pi(14/32)} \ e^{j2\pi(21/32)} \ e^{j2\pi(28/32)}]^T$. When a 5×9 matrix $C_{2,9}$ is generated by multiplying the two vectors and 15 elements are selected using Equation 23, a code vector $c_{2,9}$ for the uniform triangular array is obtained. If a similar method is repeatedly performed on all the indices p and q, the codebook C including a total of 8×32 code vectors is configured.

In order to select the indices p and q, a channel state information reference signal (CSI-RS) must be transmitted.

According to an embodiment, the indices p and q may be selected as follows.

In the case of the index q for horizontal beamforming, a base station may transmit a CSI-RS through antenna elements disposed in the last row in which the number of antenna elements is the greatest (corresponding to antenna elements located in an l=5 row in FIG. 16). q may be selected through the feedback of a UE for the corresponding CSI-RS.

In the case of the vertical beamforming index p, a base station may transmit a CSI-RS through the antenna elements of a center column in which the number of antenna elements is the greatest (corresponding to antenna elements located in a k=5 row in FIG. 16). p may be selected through the feedback of a UE for the corresponding CSI-RS. However, all the antenna elements of each column are not used in the center column. As a supplement for this, the base station may increase the accuracy of channel estimation by transmitting a CSI-RS based on antenna elements present in columns adjacent to the center column. Specifically, the base station may transmit a CSI-RS based on antenna ports of two columns by additionally using an element corresponding to k=4 indicated by an alternated long and short dash line in addition to an element corresponding to k=5 indicated by a solid line in FIG. 16.

Hereinafter, three-dimensional antenna array structures having various forms using the uniform triangular array are described with reference to FIGS. 17 to 19.

Three-dimensional antenna array structures having various forms may be configured using the uniform triangular array. A shape which may be attached to a ceiling or a wall surface may be implemented in a form suitable for a small cell that is located indoors by using the uniform triangular array as a unit module. FIG. 17 illustrates such a shape.

FIG. 17 is an example of three-dimensional antenna structures using uniform triangular arrays according to an embodiment of the present disclosure.

(a) of FIG. 17 to (c) of FIG. 17 illustrate ceiling type three-dimensional antenna structures configured while increasing the number M of panels each having a uniform triangular array to 3, 4, and 5. When an angle between an antenna reference direction, that is, the front direction of the panel, and a perpendicular vertical to a ceiling surface is measured, the angles have 70.5°, 54.7°, and 37.4° with respect to M=3, 4, and 5, respectively.

As M is increased, the panels are further closely attached to the ceiling. When M is 6, an antenna array in which the panels are present on the same plane as the ceiling surface is obtained. As described above, an antenna structure having a proper shape may be selected and used depending on the size of an interior and an expected distribution of UEs.

A polyhedron shape may be configured using a uniform triangular array. Accordingly, a signal can be transmitted in all directions of a three-dimensional space.

FIG. 18 is another example of three-dimensional antenna structures using uniform triangular arrays according to an embodiment of the present disclosure.

(a) of FIG. 18 to (d) of FIG. 18 illustrate polyhedron arrays composed of M=4, 8, 20, and 60 panels. (a) of FIG. 18 to (c) of FIG. 18 correspond to a regular tetrahedron, a regular octahedron, and a regular icosahedron, respectively. The polyhedron of (d) of FIG. 18 illustrates an array configured by dividing a pentagon, that is, each face of a regular dodecahedron, into five regular triangles.

Furthermore, an antenna array may be configured in a way to continuously dispose a uniform triangular array similarly to a circular cylinder form. This is illustrated in FIG. 19.

FIG. 19 is still another example of three-dimensional antenna structures each using a uniform triangular array according to an embodiment of the present disclosure.

(a) of FIG. 19 to (c) of FIG. 19 illustrate antenna arrays having cylinder forms. The number of panels is M=6, 8, or 10.

An antenna array configured as described above may be usefully used in a multi-sector base station. Specifically, an antenna array having a cylinder form can transmit a signal at various angles because panels are disposed in a tilted direction on the down and upper sides compared to the existing uniform rectangular array.

Hereinafter, a determination of a panel is described with reference to FIGS. 20 to 24 if an antenna array includes a plurality of panels.

A multi-panel three-dimensional antenna array using a uniform triangular array may be used to transmit a signal to a plurality of UEs. In this case, a proper number of collaborating panels need to be determined by considering an increase in the number of UEs.

When a maximum number of panels allocated to each UE is set as M', an example of a method of allocating panels to each UE is illustrated in FIG. 20.

FIG. 20 is a flowchart for describing an algorithm related to panel allocation when a signal is transmitted to a plurality of UEs according to an embodiment of the present disclosure.

Referring to FIG. 20, a base station may allocate, to each UE, M' panels through which a signal having the best quality can be transmitted.

In S2010, the base station starts to allocate the panels to a k-th UE by setting the number of currently allocated panels N to 1. In this case, k=1, 2, . . . K, and K is the number of plurality of UEs.

In S2020, the base station searches for a panel having the greatest received power of the k-th UE among candidate panels.

In S2030, the base station checks whether the retrieved panel has been allocated to another UE. If the retrieved panel has not been allocated to another UE, the base station allocates the corresponding panel to the k-th UE (S2040). If the retrieved panel has been allocated to another UE, the base station does not allocate the corresponding panel to the k-th UE.

In S2050, the base station checks whether the number of panels N currently allocated to the k-th UE is M'. If the M' panels have been allocated to the k-th UE, the base station transmits a signal through the allocated panels (S2060). If the M' panels have been allocated to the k-th UE, the number of currently allocated panels N is increased to 1 (S2070) and returns to step S2020.

Through the process, the M' panels may be allocated to each UE. In an environment in which the base station transmits a signal to a plurality of UEs, the M' panels are first allocated to a UE having greater received power in each panel. Accordingly, the number of panels actually allocated to each UE may be smaller than M'.

In order to allocate panels to each UE and use the panels for transmission, channel state information for determining a panel is necessary. Specifically, a base station transmits a reference signal (RS) to a plurality of UEs through each antenna port. Each of the plurality of UEs needs to feed back channel state information related to the reference signal.

In performing the process, if antenna elements are increased, feedback resources used to report channel state information may be greatly increased. In order to prevent this, a method of sequentially transmitting reference signals may be considered.

Specifically, the base station may form a group in which antennas and panels are grouped in a specific number for the sequential transmission of the reference signals. The base station may sequentially transmit related reference signals for each size of a group.

Reference signals transmitted in order from a case where the size of the group is great to a case where the size of the group is small may be defined as follows.

1. Wide-area reference signal (WARS)
2. Narrow-area reference signal (NARS)
3. Focused-area reference signal (FARS)

The sequential signaling of the reference signals is hereinafter specifically described with reference to FIGS. 21 to 23.

The WARS is a reference signal allocated to the greatest number of panels in common, and covers an area that is geographically the widest.

FIG. 21 illustrates a transmission situation in which a polyhedron composed of 60 uniform triangular array panels is used as an antenna array. A base station classifies 60 uniform triangle panels into four groups, and transmits a reference signal WARS for the corresponding groups. A UE feeds back channel state information for the reference signal WARS. For distinguishment from another piece of channel state information, channel state information related to the reference signal WARS may be denoted as first CSI. A base station may identify an approximate location (2) of a corresponding UE based on the first CSI.

The NARS is a reference signal related to a plurality of panels within each of a plurality of groups identified by the WARS.

Referring to FIG. 22, a base station transmits an NARS to a corresponding UE based on the first CSI. The NARS is transmitted by a plurality of panels 1 to 15 included in a corresponding group 2. The UE that has received the NARS may select a panel having the strongest received power among the plurality of panels 1 to 15, and may feed channel state information including information on the selected panel back. For distinguishment from another piece of channel state information, channel state information related to the NARS may be denoted as second CSI. Information on the selected panel may be the index of a corresponding panel.

Thereafter, the base station may perform beamforming on the UE on the basis of a selected panel 11. In order to respond to a change in the location of the UE and a channel environment, the base station may periodically transmit the FARS in the selected panel and a panel adjacent thereto. The selected panel and the panel adjacent thereto may be called collaborating panels. The naming is for convenience of description, and is not intended to limit the scope of the present disclosure.

FIG. 23 illustrates the signaling of the FARS.

(a) of FIG. 23 illustrates a situation in which a FARS is transmitted by four panels. A base station may determine panels for transmitting the FARS through second CSI. The base station may transmit the corresponding FARS to the UE through collaborating panels including a panel 11 determined based on the second CSI as a center panel. The UE that has received the FARS may feed channel state information including information related to the changed center panel back. For distinguishment from another piece of channel state information, the channel state information related to the FARS may be denoted as third CSI. Adaptive beamforming may be performed in response to a change in the location of the UE through the operation.

The third CSI may include a power boost request (PBR) that increases an increase in the size of a transmitted signal. The base station that has received the third CSI including the PBR may improve signal quality by increasing the number of collaborating panels allocated to the corresponding UE.

(b) of FIG. 23 illustrates a change in the center panel and a change in the number of collaborating panels according to the feedback of the third CSI. Referring to (b) of FIG. 23, the center panel is changed from 11 to 8, and the number of collaborating panels is increased from M'=4 to M'=10 based on the PBR.

The number of feedback bits necessary for the signaling requires a total of 6 bits, including 2 bits (one selected among 4 group indices is fed back) when a WARS is received and 4 bits (one selected among 15 panel indices is fed back) when the NARS is received.

Hereinafter, a determination of the number of collaborating panels according to the structure of an antenna array is described with reference to FIGS. 24 to 27.

If signals are received from multiple panels, the amount of power for the received signals is increased due to an increase in the number of collaborating panels, but reception performance may be saturated in a specific number or more. A proper number of collaborating panels needs to be determined by considering such a characteristic.

FIGS. 24 to 25 are graphs illustrating received power performance according to a change in the number of collaborating panels when an antenna structure is used according to an embodiment of the present disclosure.

FIG. 24 illustrates an average of received power according to the number of collaborating panels of the antenna array (FIG. 17) having a ceiling type. The average of the received power is an average of received power obtained by increasing the number of collaborating panels M' with respect to a case where a total number of panels of the antenna array are M=3, 4, 5, or 6. The location of a UE is assumed to be randomly distributed on a hemisphere having an antenna structure as the original point.

Referring to FIG. 24, when the number of panels M=3, 4, and 5, received power is saturated in the number of collaborating panels M'=2. When the number of panels is M=6, a form in which panels are attached to a ceiling in a plane form is obtained, and received power is linearly increased according to an increase of M' because the reference directions of the panels are the same. It may be seen that a small number of collaborating panels can be sufficiently used because panels have different reference directions in the remaining forms. Furthermore, an antenna composed of the number of panels M=5 among the ceiling type antenna structure has the best received power performance.

FIG. 25 illustrates an average of received power according to the number of collaborating panels of a polyhedron antenna array ((d) of FIG. 18) composed of 60 uniform triangle panels.

Referring to FIG. 25, received power is increased in a log function form according to an increase in the number of collaborating panels. The corresponding received power is saturated near the number of collaborating panels M'=20.

When a signal is transmitted to a plurality of UEs, a sum transfer rate may be used as an index for performance evaluation. A transfer rate for a UE k is defined as in Equation 26.

$$R_k = \log_2(1 + \Gamma_k) = \log_2\left(1 + \frac{|h_k v_k|^2}{\sum_{i \neq k} |h_k v_i|^2 + \sigma^2}\right) \quad \text{[Equation 26]}$$

The sum transfer rate is a value obtained by adding the transfer rates of all UEs. In Equation 26, $\Gamma_k$ indicates a signal to noise interference ratio of the UE k. $h_k$ indicates a channel of the UE k. $v_k$ is a beamforming vector for the UE k. $\sigma^2$ is noise power.

FIG. 26 is a graph illustrating sum transfer rates according to a change in the number and location of collaborating panels when a signal is transmitted to a plurality of UEs according to an embodiment of the present disclosure.

FIG. 26 is a graph illustrating sum transfer rate performance when a signal is transmitted to two UEs by using a hexahedron antenna structure. As illustrated in (a) of FIG. 26, a sum transfer rate is increased as the number of collaborating panels is increased, but is saturated after M'=5. (b) of FIG. 26 is a graph illustrating a change in the sum transfer rate according to a angle difference ψ between the two UEs. In general, it can be seen that the sum transfer rate is a maximum near ψ=100°.

FIG. 27 is a graph illustrating sum transfer rates according to a change in the number of collaborating panels and the number of UEs when a signal is transmitted to a plurality of the UEs according to an embodiment of the present disclosure.

FIG. 27 is a graph illustrating sum transfer rate performance when the number of UEs is 2 or more.

(a) of FIG. 27 illustrates sum transfer rates according to an increase in the number of collaborating panels when the number of UEs K=2, 3, 4, and 5. The convergence of the sum transfer rate according to the number of collaborating panels late occurs according to an increase of K, but an additional gain in M'>5 is very small.

(b) of FIG. 27 is a graph illustrating a sum transfer rate (solid line) and average transfer rate (dotted line) of each UE according to an increase of K. As the number of UEs K increases, the sum transfer rate is linearly increased. This a performance index illustrating that the three-dimensional antenna array proposed in the present disclosure is suitable for the transmission of a signal to a plurality of UEs.

A method proposed in the present disclosure and effects thereof are as follows.

The uniform triangular array proposed in the present disclosure may be used as a unit module for configuring various forms of three-dimensional antenna arrays. In particular, the three-dimensional antenna array may be configured in a ceiling type which may be combined with indoor lighting infra, a polyhedron type suitable for omnidirectional beamforming, a cylinder type which may substitute the existing multi-sector antenna, etc.

Furthermore, the beamforming vector equations and codebooks for using the antenna array configured as described above in the present disclosure have been proposed. Efficiency of a wireless communication system can be improved because the various forms of three-dimensional antenna arrays are used for the transmission of a signal to a plurality of UEs.

Furthermore, in relation to beamforming of the three-dimensional antenna array, the sequential reference signaling method proposed in the present disclosure enables efficient signal transmission through the proper amount of feedback.

From an implementation aspect, the operations (e.g., the signaling and operation for using the uniform triangular array) of the base station/UE according to the embodiments may be processed by apparatuses of FIGS. 32 to 37 to be described later (e.g., a processor 102, 202 of FIG. 33).

Furthermore, the operations of the base station/UEs (e.g., the signaling and operation for using the uniform triangular array) according to the embodiments may be stored in a memory (e.g., 104, 204 in FIG. 33) in the form of an instruction/program (e.g., instruction or executable code) for driving at least one processor (e.g., the processor 102, 202 of FIG. 33).

Hereinafter, the aforementioned embodiments are specifically described from a viewpoint of a method of reporting, by a UE, channel state information with reference to FIGS. 28 and 29.

Methods described hereinafter are merely classified for convenience of description, and some elements of any one method may be substituted with some elements of another method or they may be mutually combined and applied.

FIG. 28 is a flowchart for describing a method of reporting, by a UE, channel state information according to an embodiment of the present disclosure.

Referring to FIG. 28, the method of reporting, by a UE, channel state information according to an embodiment of the present disclosure may include a step S2810 of receiving a channel state information reference signal (CSI-RS), a step S2820 of generating channel state information based on the channel state information reference signal (CSI-RS) and a codebook according to a specific shape of a panel, and a step S2830 of reporting the channel state information.

In S2810, the UE receives the channel state information reference signal (CSI-RS) from a base station. An antenna array of the base station may include at least one panel. A shape of the antenna array may be a three-dimensional shape composed of a plurality of panels.

The channel state information reference signal (CSI-RS) is related to at least one panel of the antenna array of the base station.

According to S2810, the operation of receiving, by the UE (100/200 in FIGS. 32 to 37), the channel state information reference signal (CSI-RS) from the base station (100/200 in FIGS. 32 to 37) may be implemented by the apparatus of FIGS. 32 to 37.

For example, referring to FIG. 33, one or more processors 102 may control one or more transceivers 106 and/or one or more memories 104 to receive the channel state information reference signal (CSI-RS) from the base station 200.

In S2820, the UE generates the channel state information (CSI) based on the channel state information reference signal (CSI-RS) and the codebook according to the specific shape of the at least one panel.

According to an embodiment, the codebook may include a plurality of code vectors.

The channel state information (CSI) may include information related to any one code vector of the plurality of code vectors.

The code vector may include elements determined based on the specific shape, among elements of a beamforming matrix generated based on a vertical beamforming vector and a horizontal beamforming vector related to the panel.

The specific shape may be a uniform triangular shape.

According to an embodiment, the length of the vertical beamforming vector may be related to the number of rows according to the arrangement of the antenna elements in the panel having the uniform triangular shape.

The length of the horizontal beamforming vector may be related to the number of columns according to the arrangement of the antenna elements.

The code vector may include elements determined based on a specific index according to the uniform triangular shape, among the elements of the beamforming matrix.

According to an embodiment, the vertical beamforming vector satisfies the following equation.

$$a_p = [1\ e^{j2\pi p/P} e^{j2\pi 2p/P} \ldots e^{j2\pi(L-1)p/P}]^T, p=0,1,\ldots,P-1 \quad \text{[Equation]}$$

wherein $a_p$ may be the vertical beamforming vector, L may be the length of the vertical beamforming vector, p may be the index of the vertical beamforming vector, P may be the number of angles preset in relation to the vertical beamforming of the antenna array, and T may be a transpose operation.

According to an embodiment, the horizontal beamforming vector satisfies the following equation.

$$b_q = [e^{-j2\pi(L-1)q/Q} \ldots e^{-j2\pi q/Q}\ 1\ e^{j2\pi q/Q} \ldots e^{j2\pi(L-1)q/Q}]^T, \quad \text{[Equation]}$$
$$q = 0, 1, \ldots, Q-1$$

wherein $b_q$ may be the horizontal beamforming vector, L may be the length of the vertical beamforming vector, the length of the horizontal beamforming vector may be 2L−1, q may be the index of the horizontal beamforming vector, Q may be the number of angles preset in relation to the horizontal beamforming of the antenna array, and T may be a transpose operation.

According to an embodiment, the beamforming matrix satisfies the following equation.

$$C_{p,q} = a_p b_q^T \quad \text{[Equation]}$$

wherein $C_{p,q}$ may be the beamforming matrix, and T may be a transpose operation.

According to an embodiment, the code vector includes elements determined based on the specific index (l,k) among the elements of the beamforming matrix $C_{p,q}$. The specific index (l,k) satisfies the following equation.

$$l = x, \text{ if } \frac{x(x-1)}{2} < n \leq \frac{x(x+1)}{2}, k = L - l^2 + 2n - 1 \quad \text{[Equation]}$$

wherein l is 1≤l≤L and L may be the length of the vertical beamforming vector.

According to an embodiment, the codebook C satisfies the following equation.

$$C = [c_{1,1} \; c_{1,2} \; \ldots \; c_{1,Q} \; c_{2,1} \; c_{2,2} \; \ldots \; c_{2,Q} \; \ldots \; c_{P,1}$$
$$c_{P,2} \; \ldots \; c_{P,Q}] \quad \text{[Equation]}$$

wherein $c_{p,q}$ may be a code vector according to the index p of the vertical beamforming vector and the index q of the horizontal beamforming vector.

According to an embodiment, the channel state information (CSI) may include at least one of the index p of the vertical beamforming vector or the index q of the horizontal beamforming vector.

According to S2820, the operation of generating, by the UE (100/200 in FIGS. 32 to 37), the channel state information (CSI) based on the channel state information reference signal (CSI-RS) and the codebook according to the specific shape of the at least one panel may be implemented by the apparatus of FIGS. 32 to 37.

For example, referring to FIG. 37, the UE 100 may be an unmanned aerial vehicle (UAV). The controller 120 may control the communication unit 110 and/or the memory unit 130 to generate the channel state information (CSI) based on the channel state information reference signal (CSI-RS) and the codebook according to the specific shape of the at least one panel.

In S2830, the UE reports the channel state information (CSI) to the base station.

According to S2830, the operation of reporting, by the UE (100/200 in FIGS. 32 to 37), the channel state information (CSI) to the base station (100/200 in FIGS. 32 to 37) based on the channel state information reference signal (CSI-RS) and the codebook according to the specific shape of the at least one panel may be implemented by the apparatus of FIGS. 32 to 37.

For example, referring to FIG. 33, the one or more processors 102 may control the one or more transceivers 106 and/or the one or more memories 104 to report the channel state information (CSI) to the base station 200.

The antenna array may be a three-dimensional antenna array including a plurality of panels. A method of reporting, by the UE, the channel state information in relation to the three-dimensional antenna array is specifically described below with reference to FIG. 29.

FIG. 29 is a flowchart for describing a method of reporting, by a UE, channel state information according to another embodiment of the present disclosure.

Referring to FIG. 29, the method of reporting, by the UE, channel state information according to another embodiment of the present disclosure may include a step S2910 of receiving a first CSI-RS related to a plurality of panel groups, a step S2920 of reporting first CSI including information related to any one panel group of the plurality of panel groups, a step S2930 of receiving a second CSI-RS related to a plurality of panels within a panel group determined based on the first CSI, a step S2940 of reporting second CSI including information related to any one of the plurality of panels, a step S2950 of receiving a third CSI-RS related to a panel determined based on the second CSI, and a step S2960 of reporting third CSI generated based on the third CSI-RS and a codebook according to a specific shape of the panel determined based on the second CSI.

In S2910, the UE receives, from a base station, a first channel state information reference signal (CSI-RS) related to a plurality of panel groups of an antenna array of the base station.

The antenna array may include a plurality of panels. The plurality of panels included in the antenna array may be classified into a plurality of panel groups in order to reduce feedback overhead. The first CSI-RS may be a wide-area reference signal (WARS) for the sequential signaling of reference signals.

According to S2910, the operation of receiving, by the UE (100/200 in FIGS. 32 to 37), the first CSI-RS related to the plurality of panel groups of the antenna array of the base station from the base station (100/200 in FIGS. 32 to 37) may be implemented by the apparatus of FIGS. 32 to 37.

For example, referring to FIG. 33, the one or more processors 102 may control the one or more transceivers 106 and/or the one or more memories 104 to receive, from the base station 200, the first CSI-RS related to the plurality of panel groups of the antenna array of the base station.

In S2920, the UE reports, to the base station, the first CSI including the information related to any one panel group of the plurality of panel groups. The information related to the panel group may be the index of a specific panel group of the plurality of panel groups.

According to an embodiment, the UE may determine the specific panel group of the plurality of panel groups based on received power.

According to S2920, the operation of reporting, by the UE (100/200 in FIGS. 32 to 37), the first CSI including the information related to any one panel group of the plurality of panel groups to the base station (100/200 in FIGS. 32 to 37) may be implemented by the apparatus of FIGS. 32 to 37.

For example, referring to FIG. 33, the one or more processors 102 may control the one or more transceivers 106 and/or the one or more memories 104 to report, to the base station 200, the first CSI including the information related to any one panel group of the plurality of panel groups.

In S2930, the UE receives, from the base station, the second CSI-RS related to the plurality of panels within the panel group determined based on the first CSI. The second CSI-RS may be a narrow-area reference signal (NARS) for the sequential signaling of reference signals.

According to S2930, the operation of receiving, by the UE (100/200 in FIGS. 32 to 37), the second CSI-RS related to the plurality of panels within the panel group determined based on the first CSI from the base station (100/200 in FIGS. 32 to 37) may be implemented by the apparatus of FIGS. 32 to 37.

For example, referring to FIG. 33, the one or more processors 102 may control the one or more transceivers 106 and/or the one or more memories 104 to receive the second CSI-RS related to the plurality of panels within the panel group determined based on the first CSI from the base station 200.

In S2940, the UE reports, to the base station, the second CSI including the information related to any one panel of the plurality of panels. The information related to the panel may be the index of a specific panel of the plurality of panels.

According to an embodiment, the UE may determine the specific panel of the plurality of panels based on received power.

According to S2940, the operation of reporting, by the UE (100/200 in FIGS. 32 to 37), the second CSI including the information related to any one panel of the plurality of panels to the base station (100/200 in FIGS. 32 to 37) may be implemented by the apparatus of FIGS. 32 to 37.

For example, referring to FIG. 33, the one or more processors 102 may control the one or more transceivers 106 and/or the one or more memories 104 to report the second CSI including the information related to any one panel of the plurality of panels to the base station 200.

In S2950, the UE receives, from the base station, the third CSI-RS related to the panel determined based on the second CSI. The third CSI-RS may be a focused-area reference signal (FARS) for the sequential signaling of reference signals.

According to an embodiment, the third CSI-RS may be related to a plurality of collaborating panels including the panel, determined based on the second CSI, as a center panel.

According to S2950, the operation of receiving, by the UE (100/200 in FIGS. 32 to 37), the third CSI-RS related to the panel determined based on the second CSI from the base station (100/200 in FIGS. 32 to 37) may be implemented by the apparatus of FIGS. 32 to 37.

For example, referring to FIG. 33, the one or more processors 102 may control the one or more transceivers 106 and/or the one or more memories 104 to receive the third CSI-RS related to a panel determined based on the second CSI from the base station 200.

In S2960, the UE reports, to the base station, the third CSI generated based on the third CSI-RS and the codebook according to the specific shape of the panel determined based on the second CSI.

According to an embodiment, the codebook may include a plurality of code vectors.

The third CSI may include information related to any one code vector of the plurality of code vectors.

The code vector may include elements determined based on the specific shape, among the elements of a beamforming matrix generated based on a vertical beamforming vector and a horizontal beamforming vector related to the determined panel.

The specific shape may be a uniform triangular shape.

A shape of the antenna array may be a three-dimensional shape having one face related to each of a plurality of panels each having the uniform triangular shape.

According to an embodiment, the third CSI may further include information related to a center panel changed based on the location of the UE, among a plurality of collaborating panels.

According to an embodiment, the third CSI may include a power boost request (PBR) related to an increase in the number of plurality of collaborating panels. The UE may request, from the base station, an increase in the size of a transmitted signal from through the PBR.

According to an embodiment, the length of the vertical beamforming vector may be related to the number of rows according to the arrangement of the antenna elements in the panel having the uniform triangular shape.

The length of the horizontal beamforming vector may be related to the number of columns according to the arrangement of the antenna elements.

The code vector may include elements determined based on a specific index according to the uniform triangular shape, among the elements of the beamforming matrix.

According to an embodiment, the vertical beamforming vector satisfies the following equation.

$$a_p = [1 e^{j2\pi p/P} e^{j2\pi 2p/P} \ldots e^{j2\pi(L-1)p/P}]^T, p=0,1,\ldots,P-1 \quad \text{[Equation]}$$

wherein $a_p$ may be the vertical beamforming vector, L may be the length of the vertical beamforming vector, p may be the index of the vertical beamforming vector, P may be the number of angles preset in relation to the vertical beamforming of the antenna array, and T may be a transpose operation.

According to an embodiment, the horizontal beamforming vector satisfies the following equation.

$$b_q = [e^{-j2\pi(L-1)q/Q} \ldots e^{-j2\pi q/Q} 1 \; e^{j2\pi q/Q} \ldots e^{j2\pi(L-1)q/Q}]^T, \quad \text{[Equation]}$$
$$q = 0, 1, \ldots, Q-1$$

wherein $b_q$ may be the horizontal beamforming vector, L may be the length of the vertical beamforming vector, the length of the horizontal beamforming vector may be 2L−1, q may be the index of the horizontal beamforming vector, Q may be the number of angles preset in relation to the horizontal beamforming of the antenna array, and T may be a transpose operation.

According to an embodiment, the beamforming matrix satisfies the following equation.

$$C_{p,q} = a_p b_q^T \quad \text{[Equation]}$$

wherein $C_{p,q}$ may be the beamforming matrix, and T may be a transpose operation.

According to an embodiment, the code vector includes elements determined based on a specific index (l,k) among elements of the beamforming matrix $C_{p,q}$. The specific index (l,k) satisfies the following equation.

$$l = x, \text{ if } \frac{x(x-1)}{2} < n \le \frac{x(x+1)}{2}, k = L - l^2 + 2n - 1 \quad \text{[Equation]}$$

wherein l is 1≤l≤L, and L may be the length of the vertical beamforming vector.

According to an embodiment, the codebook C satisfies the following equation.

$$C = [c_{1,1} \; c_{1,2} \ldots c_{1,Q} \; c_{2,1} \; c_{2,2} \ldots c_{2,Q} \ldots c_{P,1}$$
$$c_{P,2} \ldots c_{P,Q}] \quad \text{[Equation]}$$

wherein $c_{p,c}$, may be a code vector according to the index p of the vertical beamforming vector and the index q of the horizontal beamforming vector.

According to an embodiment, the third CSI may include at least one of the index p of the vertical beamforming vector or the index q of the horizontal beamforming vector.

According to S2960, the operation of reporting, by the UE (100/200 in FIGS. 32 to 37), the third CSI generated based on the third CSI-RS and the codebook according to the specific shape of the panel determined based on the second CSI to the base station (100/200 in FIGS. 32 to 37) may be implemented by the apparatus of FIGS. 32 to 37.

For example, referring to FIG. 37, the UE 100 may be an unmanned aerial vehicle (UAV). The controller 120 may control the communication unit 110 and/or the memory unit 130 to report the third CSI generated based on the third CSI-RS and the codebook according to the specific shape of the panel determined based on the second CSI to the base station 200.

Hereinafter, the aforementioned embodiments are specifically described with reference to FIGS. 30 and 31 from a viewpoint of a method of receiving, by a base station, channel state information.

Methods described hereinafter are merely classified for convenience of description, and some elements of any one method may be substituted with some elements of another method or they may be mutually combined and applied.

FIG. 30 is a flowchart for describing a method of receiving, by a base station, channel state information according to an embodiment of the present disclosure.

Referring to FIG. 30, the method of receiving, by the base station, channel state information according to an embodiment of the present disclosure may include a step S3010 of transmitting a channel state information reference signal and a step S3020 of receiving channel state information generated based on the channel state information reference signal and a codebook according to a specific shape of a panel.

In S3010, the base station transmits a channel state information reference signal (CSI-RS) to the UE. An antenna array of the base station may include at least one panel. A shape of the antenna array may be a three-dimensional shape composed of at least one panel. The channel state information reference signal (CSI-RS) is related to the at least one panel.

According to S3010, the operation of transmitting, by the base station (100/200 in FIGS. 32 to 37), the channel state information reference signal (CSI-RS) to the UE (100/200 in FIGS. 32 to 37) may be implemented by the apparatus of FIGS. 32 to 37.

For example, referring to FIG. 33, the one or more processors 202 may control the one or more transceivers 206 and/or the one or more memories 204 to transmit the channel state information reference signal (CSI-RS) to the UE 100.

In S3020, the base station receives, from the UE, channel state information (CSI) generated based on the channel state information reference signal (CSI-RS) and the codebook according to the specific shape of the at least one panel.

According to an embodiment, the codebook may include a plurality of code vectors.

The channel state information (CSI) may include information related to any one code vector of a plurality of code vectors.

The code vector may include elements determined based on the specific shape among elements of a beamforming matrix generated based on a vertical beamforming vector and a horizontal beamforming vector related to the panel.

The specific shape may be a uniform triangular shape.

According to an embodiment, the length of the vertical beamforming vector may be related to the number of rows according to the arrangement of the antenna elements in the panel having the uniform triangular shape.

The length of the horizontal beamforming vector may be related to the number of columns according to the arrangement of the antenna elements.

The code vector may include elements determined based on a specific index according to the uniform triangular shape, among the elements of the beamforming matrix.

According to an embodiment, the vertical beamforming vector satisfies the following equation.

$$a_p = [1 e^{j2\pi p/P} e^{j2\pi 2p/P} \ldots e^{j2\pi(L-1)p/P}]^T, p=0,1,\ldots,P-1 \quad \text{[Equation]}$$

wherein $a_p$ may be the vertical beamforming vector, L may be the length of the vertical beamforming vector, p may be the index of the vertical beamforming vector, P may be the number of angles preset in relation to the vertical beamforming of the antenna array, and T may be a transpose operation.

According to an embodiment, the horizontal beamforming vector satisfies the following equation.

$$b_q = [e^{-j2\pi(L-1)q/Q} \ldots e^{-j2\pi q/Q} 1 \; e^{j2\pi q/Q} \ldots e^{j2\pi(L-1)q/Q}]^T, \quad \text{[Equation]}$$
$$q = 0, 1, \ldots, Q-1$$

wherein $b_q$ may be the horizontal beamforming vector, L may be the length of the vertical beamforming vector, the length of the horizontal beamforming vector may be 2L−1, q may be the index of the horizontal beamforming vector, Q may be the number of angles preset in relation to the horizontal beamforming of the antenna array, and T may be a transpose operation.

According to an embodiment, the beamforming matrix satisfies the following equation.

$$C_{p,q} = a_p b_q^T \quad \text{[Equation]}$$

wherein $C_{p,q}$ may be the beamforming matrix, and T may be a transpose operation.

According to an embodiment, the code vector includes elements determined based on the specific index (l,k) among the elements of the beamforming matrix $C_{p,q}$. The specific index (l,k) satisfies the following equation.

$$l = x, \text{ if } \frac{x(x-1)}{2} < n \le \frac{x(x+1)}{2}, k = L - l^2 + 2n - 1 \quad \text{[Equation]}$$

wherein l is 1≤l≤L, and L may be the length of the vertical beamforming vector.

According to an embodiment, the codebook C satisfies the following equation.

$$C=[c_{1,1} \; c_{1,2} \; \cdots \; c_{1,Q} \; c_{2,1} \; c_{2,2} \; \cdots \; c_{2,Q} \; \cdots \; c_{P,1} \; c_{P,2} \; \cdots \; c_{P,Q}] \quad \text{[Equation]}$$

wherein $c_{p,c}$ may be a code vector according to the index p of the vertical beamforming vector and the index q of the horizontal beamforming vector.

According to an embodiment, the channel state information (CSI) may include at least one of the index p of the vertical beamforming vector or the index q of the horizontal beamforming vector.

According to S3020, the operation of receiving, by the base station (100/200 in FIGS. 32 to 37), the channel state information (CSI) generated based on the channel state information reference signal (CSI-RS) and the codebook according to the specific shape of the at least one panel from the UE (100/200 in FIGS. 32 to 37) may be implemented by the apparatus of FIGS. 32 to 37.

For example, referring to FIG. 37, the UE 100 may be an unmanned aerial vehicle (UAV). The controller 220 may control the communication unit 210 and/or the memory unit 230 to receive the channel state information (CSI) generated based on the channel state information reference signal (CSI-RS) and the codebook according to the specific shape of the at least one panel from the unmanned aerial vehicle 100.

The antenna array may be a three-dimensional antenna array including a plurality of panels. The base station may transmit a signal to a plurality of UEs by using the three-dimensional antenna array. A method of receiving, by the base station, channel state information from the plurality of UEs is specifically described below with reference to FIG. 31.

FIG. 31 is a flowchart for describing a method of receiving, by a base station, channel state information according to another embodiment of the present disclosure.

Referring to FIG. 31, according to another embodiment of the present disclosure, the method of receiving, by the base station, channel state information may include a step S3110 of transmitting a first CSI-RS related to a plurality of panel groups, a step S3120 receiving first CSI including information related to any one panel group of the plurality of panel groups, a step S3130 of transmitting a second CSI-RS related to a plurality of panels within a panel group determined based on the first CSI, a step S3140 of receiving second CSI including information related to any one of the plurality of panels, a step S3150 of transmitting a third CSI-RS related to a panel determined based on the second CSI, and a step S3160 of receiving third CSI generated based on the third CSI-RS and a codebook according to a specific shape of the panel determined based on the second CSI.

In S3110, the base station receives, from the plurality of UEs, the first channel state information reference signal (CSI-RS) related to the plurality of panel groups of an antenna array of the base station.

The antenna array may include a plurality of panels. The plurality of panels included in the antenna array may be classified into the plurality of panel groups in order to reduce feedback overhead. The first CSI-RS may be a wide-area reference signal (WARS) for the sequential signaling of reference signals.

According to S3110, the operation of transmitting, by the base station (100/200 in FIGS. 32 to 37), the first CSI-RS related to the plurality of panel groups of the antenna array of the base station to the plurality of UEs (100/200 in FIGS. 32 to 37) may be implemented by the apparatus of FIGS. 32 to 37.

For example, referring to FIG. 33, the one or more processors 202 may control the one or more transceivers 206 and/or the one or more memories 204 to transmit the first CSI-RS related to the plurality of panel groups of the antenna array of the base station 200 to the plurality of UEs 100.

In S3120, the base station receives, from each of the plurality of UEs, the first CSI including the information related to any one panel group of the plurality of panel groups. The information related to the panel group may be the index of a specific panel group of the plurality of panel groups.

According to an embodiment, the specific panel group may be a panel group determined based on received power of each of the plurality of UEs among the plurality of panel groups.

According to S3120, the operation of receiving, by the base station (100/200 in FIGS. 32 to 37), the first CSI including the information related to any one panel group of the plurality of panel groups from the plurality of UEs (100/200 in FIGS. 32 to 37) may be implemented by the apparatus of FIGS. 32 to 37.

For example, referring to FIG. 33, the one or more processors 202 may control the one or more transceivers 206 and/or the one or more memories 204 to receive the first CSI including the information related to any one panel group of the plurality of panel groups from the plurality of UEs 100.

In S3130, the base station transmits, to the plurality of UEs, the second CSI-RS related to the plurality of panels within the panel group determined based on the first CSI. The second CSI-RS may be a narrow-area reference signal (NARS) for the sequential signaling of reference signals.

According to S3130, the operation of transmitting, by the base station (100/200 in FIGS. 32 to 37), the second CSI-RS related to the plurality of panels within the panel group determined based on the first CSI to the plurality of UEs (100/200 in FIGS. 32 to 37) may be implemented by the apparatus of FIGS. 32 to 37.

For example, referring to FIG. 33, the one or more processors 202 may control the one or more transceivers 206 and/or the one or more memories 204 to transmit the second CSI-RS related to the plurality of panels within the panel group determined based on the first CSI to the plurality of UEs 100.

In S3140, the base station receives, from the plurality of UEs, the second CSI including the information related to any one panel of the plurality of panels. The information related to the panel may be the index of a specific panel of the plurality of panels.

According to an embodiment, the specific panel may be a panel determined based on received power of each of the plurality of UEs among the plurality of panels.

According to S3140, the operation of receiving, by the base station (100/200 in FIGS. 32 to 37), the second CSI including the information related to any one panel of the plurality of panels from the plurality of UEs (100/200 in FIGS. 32 to 37) may be implemented by the apparatus of FIGS. 32 to 37.

For example, referring to FIG. 33, the one or more processors 202 may control the one or more transceivers 206 and/or the one or more memories 204 to receive the second CSI including the information related to any one panel of the plurality of panels from the plurality of UEs 100.

In S3150, the base station transmits, to the plurality of UEs, the third CSI-RS related to the panel determined based on the second CSI. The third CSI-RS may be a focused-area reference signal (FARS) for the sequential signaling of reference signals According to an embodiment, the third CSI-RS may be related to a plurality of collaborating panels including the panel, determined based on the second CSI, as a center panel.

According to S3150, the operation of transmitting, by the base station (100/200 in FIGS. 32 to 37), the third CSI-RS related to the panel determined based on the second CSI to the plurality of UEs (100/200 in FIGS. 32 to 37) may be implemented by the apparatus of FIGS. 32 to 37.

For example, referring to FIG. 33, the one or more processors 202 may control the one or more transceivers 206 and/or the one or more memories 204 to transmit the third CSI-RS related to the panel determined based on the second CSI to the plurality of UEs 100.

In S3160, the base station receives, from the plurality of UEs, the third CSI generated based on the third CSI-RS and the codebook according to the specific shape of the panel determined based on the second CSI.

According to an embodiment the codebook may include a plurality of code vectors.

The third CSI may include information related to any one code vector of the plurality of code vectors.

The code vector may include elements determined based on the specific shape among elements of a beamforming matrix generated based on a vertical beamforming vector and a horizontal beamforming vector related to the determined panel.

The specific shape may be a uniform triangular shape.

A shape of the antenna array may be a three-dimensional shape having one face related to each of a plurality of panels each having the uniform triangular shape.

According to an embodiment, the third CSI may further include information related to the center panel changed based on the location of each of the plurality of UEs among the plurality of collaborating panels.

According to an embodiment, the third CSI may include a power boost request (PBR) related to an increase in the number of plurality of collaborating panels. When the base station receives, from any one of the plurality of UEs, the third CSI including the PBR, the base station increases the number of collaborating panels allocated to transmit a signal to a corresponding UE.

According to an embodiment, the length of the vertical beamforming vector may be related to the number of rows according to the arrangement of the antenna elements in the panel having the uniform triangular shape.

The length of the horizontal beamforming vector may be related to the number of columns according to the arrangement of the antenna elements.

The code vector may include elements determined based on a specific index according to the uniform triangular shape among the elements of the beamforming matrix.

According to an embodiment, the vertical beamforming vector satisfies the following equation.

$$a_p = [1 \ e^{j2\pi p/P} e^{j2\pi 2p/P} \ ... \ e^{j2\pi(L-1)p/P}]^T, \quad \text{[Equation]}$$
$$p = 0, 1, ... , P-1$$

wherein $a_p$ may be the vertical beamforming vector, L may be the length of the vertical beamforming vector, p may be the index of the vertical beamforming vector, P may be the number of angles preset in relation to the vertical beamforming of the antenna array, and T may be a transpose operation.

According to an embodiment, the horizontal beamforming vector satisfies the following equation.

$$b_q = [e^{-j2\pi(L-1)q/Q} \ ... \ e^{-j2\pi q/Q} 1 \ e^{j2\pi q/Q} \ ... \ e^{j2\pi(L-1)q/Q}]^T, \quad \text{[Equation]}$$
$$q = 0, 1, ... , Q-1$$

wherein $b_q$ may be the horizontal beamforming vector, L may be the length of the vertical beamforming vector, the length of the horizontal beamforming vector may be 2L−1, q may be the index of the horizontal beamforming vector, Q may be the number of angles preset in relation to the horizontal beamforming of the antenna array, and T may be a transpose operation.

According to an embodiment, the beamforming matrix satisfies the following equation.

$$C_{p,q} = a_p b_q^T \quad \text{[Equation]}$$

wherein $C_{p,q}$ may be the beamforming matrix, and T may be a transpose operation.

According to an embodiment, the code vector includes elements determined based on the specific index (l,k) among the elements of the beamforming matrix $C_{p,q}$. The specific index (l,k) satisfies the following equation.

$$l = x, \text{ if } \frac{x(x-1)}{2} < n \le \frac{x(x+1)}{2}, k = L - l^2 + 2n - 1 \quad \text{[Equation]}$$

wherein l is 1≤l≤L, and L may be the length of the vertical beamforming vector.

According to an embodiment, the codebook C satisfies the following equation.

$$C=[c_{1,1} \ c_{1,2} \ ... \ c_{1,Q} \ c_{2,1} \ c_{2,2} \ ... \ c_{2,Q} \ ... \ c_{P,1}$$
$$c_{P,2} \ ... \ c_{P,Q}] \quad \text{[Equation]}$$

wherein $c_{p,q}$ may be a code vector according to the index p of the vertical beamforming vector and the index q of the horizontal beamforming vector.

According to an embodiment, the third CSI may include at least one of the index p of the vertical beamforming vector or the index q of the horizontal beamforming vector.

According to S3160, the operation of receiving, by the base station (100/200 in FIGS. 32 to 37), the third CSI generated based on the third CSI-RS and the codebook according to the specific shape of the panel determined based on the second CSI from the plurality of UEs (100/200 in FIGS. 32 to 37) may be implemented by the apparatus of FIGS. 32 to 37.

For example, referring to FIG. 37, the plurality of UEs 100 may be unmanned aerial vehicles (UAVs). The controller 220 may control the communication unit 210 and/or the memory unit (230 to receive the third CSI generated based on the third CSI-RS and the codebook according to the specific shape of the panel determined based on the second CSI from the plurality of the unmanned aerial vehicles 100.

Example of wireless communication system applied to the present disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 32 illustrates a communication system 1 applied to the present disclosure.

Referring to FIG. 32, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head- Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of wireless device applied to the present disclosure.

FIG. 33 illustrates wireless devices applicable to the present disclosure.

Referring to FIG. 33, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 32.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of signal processing circuit applied to the present disclosure

FIG. 34 illustrates a signal process circuit for a transmission signal.

Referring to FIG. 34, a signal processing circuit 1000 may include scramblers 1010, modulators 1020, a layer mapper 1030, a precoder 1040, resource mappers 1050, and signal generators 1060. An operation/function of FIG. 34 may be performed, without being limited to, the processors 102 and 202 and/or the transceivers 106 and 206 of FIG. 33. Hardware elements of FIG. 34 may be implemented by the processors 102 and 202 and/or the transceivers 106 and 206 of FIG. 33. For example, blocks 1010 to 1060 may be implemented by the processors 102 and 202 of FIG. 33. Alternatively, the blocks 1010 to 1050 may be implemented by the processors 102 and 202 of FIG. 33 and the block 1060 may be implemented by the transceivers 106 and 206 of FIG. 33.

Codewords may be converted into radio signals via the signal processing circuit 1000 of FIG. 34. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 34. For example, the wireless devices (e.g., 100 and 200 of FIG. 33) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a post-coding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of application of wireless device applied to the present disclosure

FIG. 35 illustrates another example of a wireless device applied to the present disclosure.

The wireless device may be implemented in various forms according to a use-case/service (refer to FIG. 32). Referring to FIG. 35, wireless devices 100 and 200 may correspond to the wireless devices 100 and 200 of FIG. 33 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 33. For example, the transceiver(s) 114 may include the one or more transceivers 106 and 206 and/or the one or more antennas 108 and 208 of FIG. 33. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 32), the vehicles (100b-1 and 100b-2 of FIG. 32), the XR device (100c of FIG. 32), the hand-held device (100d of FIG. 32), the home appliance (100e of FIG. 32), the IoT device (100f of FIG. 32), a digital broadcast terminal, a hologram device, a public safety device, an MTC device, a medicine device, a fintech device (or a finance device), a security device, a climate/environment device, the AI server/device (400 of FIG. 32), the BSs (200 of FIG. 32), a network node, etc. The wireless device may be used in a mobile or fixed place according to a use-example/service.

In FIG. 35, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of hand-held device applied to the present disclosure

FIG. 36 illustrates a hand-held device applied to the present disclosure.

The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 36, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 35, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Example of vehicle or autonomous driving vehicle applied to the present disclosure FIG. 37 illustrates a vehicle or an autonomous driving vehicle applied to the present disclosure.

The vehicle or autonomous driving vehicle may be implemented by a mobile robot, a car, a train, a manned/unmanned Aerial Vehicle (AV), a ship, etc.

Referring to FIG. 37, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 35, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information on a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Effects of the method and apparatus for reporting, by a UE, channel state information in a wireless communication system according to an embodiment of the present disclosure are as follows.

According to an embodiment of the present disclosure, the UE generates channel state information based on a codebook according to a specific shape of at least one panel of an antenna array. The specific shape is a uniform triangular shape. The antenna array having the uniform triangular shape may be implemented in various three-dimensional shapes. Accordingly, according to the present disclosure, although an antenna array of a base station is implemented in various three-dimensional shapes, efficient beamforming can be performed because the channel state information generated based on the codebook is reported.

Furthermore, according to an embodiment of the present disclosure, the codebook includes a plurality of code vectors. The code vector includes elements determined based on the specific shape among elements of a beamforming matrix generated based on a vertical beamforming vector and a horizontal beamforming vector related to the panel. Accordingly, the present disclosure can generate channel state information suitable for a shape of a panel included in an antenna array.

Furthermore, according to an embodiment of the present disclosure, although an antenna array of a base station includes a plurality of panels, a UE reports first to third CSI with respect to first to third CSI-RSs that are sequentially transmitted. Any one of the plurality of panels is determined through such sequential signaling.

If one panel of the plurality of panels is determined through one signaling, feedback resources used to report channel state information may be greatly increased due to an increase in the number of plurality of panels and the number of antenna elements included in each panel. In contrast, the present disclosure can reduce feedback overhead of channel state information through sequential signaling.

Furthermore, according to an embodiment of the present disclosure, the third CSI further includes information related to a center panel changed based on the location of a UE among a plurality of collaborating panels. Accordingly, adaptive beamforming can be performed in response to a change in the location of the UE.

Furthermore, according to an embodiment of the present disclosure, a shape of the antenna array is a three-dimensional shape having one face related to each of a plurality of panels each having the uniform triangular shape. A UE reports channel state information suitable for the shape of the antenna array. Accordingly, according to the present disclosure, efficient beamforming can be performed in a direction where a corresponding UE capable of moving to various locations, such as a drone, is located.

Furthermore, according to an embodiment of the present disclosure, the third CSI includes a power boost request (PBR) related to an increase in the number of plurality of collaborating panels. Signal quality is improved because the number of collaborating panels that transmit signals is increased due to the third CSI. Accordingly, if a plurality of panels is included in an antenna array of a base station, all the panels are not used, but a proper number of panels in which signal quality is considered are used. Unused panels may be used for another UE. Accordingly, the present disclosure can use a plurality of panels more effectively in a communication environment in which a plurality of UEs is present.

The embodiments of the present disclosure described hereinafter are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method of reporting, by a user equipment (UE), channel state information (CSI) in a wireless communication system, the method comprising:
receiving a channel state information reference signal (CSI-RS) from a base station, wherein the channel state information reference signal (CSI-RS) is related to at least one panel of an antenna array of the base station;
generating channel state information (CSI) based on the channel state information reference signal (CSI-RS) and a codebook according to a specific shape of the at least one panel; and
reporting the channel state information (CSI) to the base station,
wherein the codebook includes a plurality of code vectors,
wherein the channel state information (CSI) includes information related to any one code vector of a plurality of code vectors,
wherein the code vector includes elements determined based on the specific shape among elements of a beamforming matrix generated based on a vertical beamforming vector and a horizontal beamforming vector related to the panel, and
wherein the specific shape is a uniform triangular shape.

2. The method of claim 1,
wherein a length of the vertical beamforming vector is related to a number of rows according to an arrangement of antenna elements in the panel having the uniform triangular shape,
wherein a length of the horizontal beamforming vector is related to a number of columns according to the arrangement of the antenna elements, and
wherein the code vector includes elements determined based on a specific index according to the uniform triangular shape among the elements of the beamforming matrix.

3. The method of claim 2,
wherein the vertical beamforming vector satisfies an equation below $$a_p = [1 \ e^{j2\pi p/P} \ e^{j2\pi 2p/P} \ \ldots \ e^{j2\pi(L-1)p/P}]^T, \qquad \text{[Equation]}$$
$$p = 0, 1, \ldots, P = 1$$

wherein $a_p$ is the vertical beamforming vector, L is the length of the vertical beamforming vector, p is an index of the vertical beamforming vector, P is a number of angles preset in relation to vertical beamforming of the antenna array, and T is a transpose operation.

4. The method of claim 3,
wherein the horizontal beamforming vector satisfies an equation below $$b_q = [e^{-j2\pi(L-1)q/Q} \ \ldots \ e^{-j2\pi q/Q} 1 e^{j2\pi q/Q} \ \ldots \ e^{j2\pi(L-1)q/Q}]^T, q=0,1,\ldots,Q-1 \qquad \text{[Equation]}$$

wherein $b_q$ is the horizontal beamforming vector, L is the length of the vertical beamforming vector, the length of the horizontal beamforming vector is 2L−1, q is an index of the horizontal beamforming vector, Q is a number of angles preset in relation to horizontal beamforming of the antenna array, and T is the transpose operation.

5. The method of claim 4,
wherein the beamforming matrix satisfies an equation below $$C_{p,q} = a_p b_q^T \quad \text{[Equation]}$$

wherein $C_{p,q}$ is the beamforming matrix, and T is the transpose operation.

6. The method of claim 5,
wherein the code vector includes elements determined based on the specific index (l,k) among the elements of the beamforming matrix $C_{p,q}$, and
wherein the specific index (l,k) satisfies an equation below $$l = x, \text{ if } \frac{x(x-1)}{2} < n \leq \frac{x(x+1)}{2}, k = L - l^2 + 2n - 1 \quad \text{[Equation]}$$

wherein l is $1 \leq l \leq L$, and L is the length of the vertical beamforming vector.

7. The method of claim 6,
wherein the codebook C satisfies an equation $$C = [c_{1,1}\ c_{1,2}\ \ldots\ c_{1,Q}\ c_{2,1}\ c_{2,2}\ \ldots\ c_{2,Q}\ \ldots\ c_{P,1}\ c_{P,2}\ \ldots\ c_{P,Q}] \quad \text{[Equation]}$$

wherein $c_{p,q}$ is a code vector according to the index p of the vertical beamforming vector and the index q of the horizontal beamforming vector.

8. The method of claim 7,
wherein the channel state information (CSI) includes at least one of the index p of the vertical beamforming vector or the index q of the horizontal beamforming vector.

9. A method of reporting, by a user equipment (UE), channel state information (CSI) in a wireless communication system, the method comprising:
receiving, from a base station, a first channel state information reference signal (CSI-RS) related to a plurality of panel groups of an antenna array of the base station;
reporting, to the base station, first CSI including information related to any one panel group of the plurality of panel groups;
receiving, from the base station, a second CSI-RS related to a plurality of panels within a panel group determined based on the first CSI;
reporting, to the base station, second CSI including information related to any one panel of the plurality of panels;
receiving, from the base station, a third CSI-RS related to a panel determined based on the second CSI; and
reporting, to the base station, third CSI generated based on the third CSI-RS and a codebook according to a specific shape of the panel determined based on the second CSI,
wherein the codebook includes a plurality of code vectors,
wherein the third CSI includes information related to any one code vector of the plurality of code vectors,
wherein the code vector includes elements determined based on the specific shape among elements of a beamforming matrix generated based on a vertical beamforming vector and a horizontal beamforming vector related to the determined panel,
wherein the specific shape is a uniform triangular shape, and wherein a shape of the antenna array is a three-dimensional shape having one face related to each of a plurality of panels each having the uniform triangular shape.

10. The method of claim 9,
wherein the third CSI-RS is related to a plurality of collaborating panels including the panel, determined based on the second CSI, as a center panel, and
wherein the third CSI further includes information related to the center panel changed based on a location of the UE among the plurality of collaborating panels.

11. The method of claim 10,
wherein the third CSI includes a power boost request (PBR) related to an increase in a number of plurality of collaborating panels.

12. The method of claim 9,
wherein a length of the vertical beamforming vector is related to a number of rows according to an arrangement of antenna elements in the panel having the uniform triangular shape,
wherein a length of the horizontal beamforming vector is related to a number of columns according to the arrangement of the antenna elements, and
wherein the code vector includes elements determined based on a specific index according to the uniform triangular shape among the elements of the beamforming matrix.

13. A user equipment (UE) reporting channel state information (CSI) in a wireless communication system, comprising:
a transceiver;
a memory; and
a processor connected to the transceiver and the memory,
wherein the processor is configured to:
receive a channel state information reference signal (CSI-RS) from a base station, wherein the channel state information reference signal (CSI-RS) is related to at least one panel of an antenna array of the base station,
generate channel state information (CSI) based on the channel state information reference signal (CSI-RS) and a codebook according to a specific shape of the at least one panel, and
report the channel state information (CSI) to the base station,
wherein the codebook includes a plurality of code vectors,
wherein the channel state information (CSI) includes information related to any one code vector of a plurality of code vectors,
wherein the code vector includes elements determined based on the specific shape among elements of a beamforming matrix generated based on a vertical beamforming vector and a horizontal beamforming vector related to the panel, and
wherein the specific shape is a uniform triangular shape.

14. The UE of claim 13,
wherein a length of the vertical beamforming vector is related to a number of rows according to an arrangement of antenna elements in the panel having the uniform triangular shape,
wherein a length of the horizontal beamforming vector is related to a number of columns according to the arrangement of the antenna elements, and
wherein the code vector includes elements determined based on a specific index according to the uniform triangular shape among the elements of the beamforming matrix.

15. The UE of claim 14,
wherein the vertical beamforming vector satisfies an equation below $$a_p = [1\ e^{j2\pi p/P} e^{j2\pi 2p/P} \ldots e^{j2\pi(L-1)p/P}]^T, p=0,1,\ldots,P-1 \quad \text{[Equation]}$$

wherein $a_p$ is the vertical beamforming vector, L is the length of the vertical beamforming vector, p is an index of the vertical beamforming vector, P is a number of angles preset in relation to vertical beamforming of the antenna array, and T is a transpose operation.

16. The UE of claim 15,
wherein the horizontal beamforming vector satisfies an equation below $$b_q = [e^{-j2\pi(L-1)q/Q} \ldots e^{-j2\pi q/Q}\ 1\ e^{j2\pi q/Q} \ldots e^{j2\pi(L-1)q/Q}]^T, \quad \text{[Equation]}$$
$$q = 0, 1, \ldots, Q-1$$

wherein $b_q$ is the horizontal beamforming vector, L is the length of the vertical beamforming vector, the length of the horizontal beamforming vector is 2L−1, q is an index of the horizontal beamforming vector, Q is a number of angles preset in relation to horizontal beamforming of the antenna array, and T is the transpose operation.

17. The UE of claim 16,
wherein the beamforming matrix satisfies an equation below $$C_{p,q} = a_p b_q^T \quad \text{[Equation]}$$

wherein $C_{p,q}$ is the beamforming matrix, and T is the transpose operation.

18. The UE of claim 17,
wherein the code vector includes elements determined based on the specific index (l,k) among the elements of the beamforming matrix $C_{p,q}$, and
wherein the specific index (l,k) satisfies an equation below $$l = x, \text{ if } \frac{x(x-1)}{2} < n \le \frac{x(x+1)}{2}, k = L - l^2 + 2n - 1 \quad \text{[Equation]}$$

wherein l is 1≤l≤L, and L is the length of the vertical beamforming vector.

\* \* \* \* \*